US012443292B2

(12) United States Patent
Hou

(10) Patent No.: US 12,443,292 B2
(45) Date of Patent: Oct. 14, 2025

(54) INPUT DETECTION APPARATUS AND RELATED INPUT DEVICE

(71) Applicant: HUAWEI TECHNOLOGIES CO., LTD., Guangdong (CN)

(72) Inventor: Xiaoke Hou, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 52 days.

(21) Appl. No.: 18/587,774

(22) Filed: Feb. 26, 2024

(65) Prior Publication Data

US 2024/0281075 A1  Aug. 22, 2024

Related U.S. Application Data

(63) Continuation of application No. PCT/CN2022/115505, filed on Aug. 29, 2022.

(30) Foreign Application Priority Data

Aug. 31, 2021 (CN) .......................... 202111015195.3

(51) Int. Cl.
| | |
|---|---|
| G06F 3/0354 | (2013.01) |
| G06F 3/03 | (2006.01) |
| G06F 3/0346 | (2013.01) |
| G06F 3/038 | (2013.01) |
| G06F 3/041 | (2006.01) |

(52) U.S. Cl.
CPC ........ *G06F 3/03545* (2013.01); *G06F 3/0304* (2013.01); *G06F 3/0346* (2013.01); *G06F 3/0383* (2013.01); *G06F 3/04162* (2019.05)

(58) Field of Classification Search
None
See application file for complete search history.

(56) References Cited

U.S. PATENT DOCUMENTS

| | | | |
|---|---|---|---|
| 2007/0164201 A1 | 7/2007 | Liess et al. | |
| 2009/0212201 A1* | 8/2009 | Duijve | ................ G06F 3/03547 250/221 |
| 2009/0303458 A1* | 12/2009 | Heinks | .................... G01P 3/366 356/5.09 |
| 2010/0321668 A1* | 12/2010 | Ueno | ...................... G01S 17/34 356/4.01 |

(Continued)

FOREIGN PATENT DOCUMENTS

CN   101154136 A   4/2008

*Primary Examiner* — Matthew Yeung

(57) ABSTRACT

An input detection apparatus: includes at least two first lasers, at least two second lasers, and a processor. Each laser may emit laser light and generate a self-mixing interference signal when the laser light is reflected into a resonant cavity of the laser through a reference plane. The processor may determine a first displacement of the input detection apparatus in the reference plane based on self-mixing interference signals generated by all the first lasers and relative position information between the at least two first lasers, and determine a second displacement of the input detection apparatus in the reference plane based on self-mixing interference signals generated by all the second lasers and relative position information between the at least two second lasers. The processor determines a movement path of the input detection apparatus in the reference plane based on the first displacement and the second displacement.

20 Claims, 11 Drawing Sheets

(56) References Cited

U.S. PATENT DOCUMENTS

| | | | | |
|---|---|---|---|---|
| 2015/0277641 | A1* | 10/2015 | Zhou | G02B 6/00 |
| | | | | 345/175 |
| 2017/0361452 | A1* | 12/2017 | Jatekos | B25F 5/021 |
| 2020/0200522 | A1* | 6/2020 | Huang | G01S 7/497 |
| 2020/0318945 | A1* | 10/2020 | Mutlu | G01P 5/26 |
| 2020/0319082 | A1* | 10/2020 | Mutlu | G01P 5/001 |
| 2022/0121279 | A1* | 4/2022 | Petersen | G06F 3/013 |
| 2023/0085489 | A1* | 3/2023 | Yamada | G01B 9/02002 |
| | | | | 356/450 |

* cited by examiner

INPUT DETECTION APPARATUS AND RELATED INPUT DEVICE

CROSS-REFERENCE TO RELATED APPLICATIONS

This filing is a continuation of International Application No. PCT/CN2022/115505 filed on Aug. 29, 2022, which claims priority to Chinese Patent Application No. 202111015195.3 filed on Aug. 31, 2021. The disclosures of the aforementioned applications are hereby incorporated by reference in their entireties.

TECHNICAL FIELD

Disclosed embodiments relate to the field of optoelectronic technologies, and in particular, to an input detection apparatus and a related input device.

BACKGROUND

For a mouse used currently, a left button area is held down to perform writing or drawing. In addition, in a process of writing and drawing, the mouse needs to be attached to a desktop. If the mouse is raised from the desktop by a particular height, no matter how the mouse is moved, the mouse cannot perform writing or drawing, that is, a movement path of the mouse cannot be detected. In other words, in the conventional technology, in a process of writing or drawing with a mouse, detection of a movement path of the mouse is limited by a height by which the mouse is raised from a desktop (that is, a lift-off distance), and the movement path of the mouse can be detected only when the mouse is within a range of the lift-off distance. For example, if the lift-off distance of the mouse is 3 millimeters, when the height of the mouse from the desktop is not greater than 3 millimeters, the movement path of the mouse in the process of writing or drawing can be detected. When the height of the mouse from the desktop is greater than 3 millimeters, the mouse does not respond. In summary, it may be concluded that handwriting and drawing experience of the mouse in the conventional technology is not good.

SUMMARY

This disclosure provides an input detection apparatus and a related input device. The input detection apparatus has a function of integrating a mouse and a stylus, and can achieve experience similar to that of natural writing or drawing by a user holding a pen based on implementation of a mouse control function, so that handwriting or drawing experience is good.

According to a first aspect, an embodiment provides an input detection apparatus. The input detection apparatus includes lasers and a processor. The lasers include at least two first lasers disposed in a first axial direction and at least two second lasers disposed in a second axial direction. The first axial direction is perpendicular to the second axial direction. All first lasers and all second lasers are coupled to the processor. The laser may emit laser light, and generate a self-mixing interference signal when the laser light is reflected into a resonant cavity of the laser through a reference plane. The processor may determine a first displacement of the input detection apparatus in the reference plane based on self-mixing interference signals generated by all the first lasers and relative position information between the at least two first lasers, and determine a second displacement of the input detection apparatus in the reference plane based on self-mixing interference signals generated by all the second lasers and relative position information between the at least two second lasers. The processor may further determine a movement path of the input detection apparatus in the reference plane based on the first displacement and the second displacement of the input detection apparatus in the reference plane. In an embodiment, displacements of the input detection apparatus are measured by using laser self-mixing interference, so that based on implementation of a mouse control function, a problem that writing experience is poor because a left button area of a mouse in the conventional technology needs to be held down to perform handwriting or drawing may be resolved, and experience similar to that of natural writing or drawing by a user holding a pen is achieved.

With reference to the first aspect, in a first possible implementation, that the processor determines a first displacement of the input detection apparatus in the reference plane based on self-mixing interference signals generated by all the first lasers and relative position information between the at least two first lasers is specifically implemented as:

The processor separately determines distances between laser emission spots of all the first lasers and laser reflection spots of the reference plane based on the self-mixing interference signals generated by all the first lasers, and determines, based on the distances between the laser emission spots of all the first lasers and the laser reflection spots of the reference plane and the relative position information between the at least two first lasers, an included angle between an optical axis of laser light emitted by any first laser and the reference plane. The processor further determines, based on a self-mixing interference signal generated by the any first laser, a speed of the input detection apparatus relative to the reference plane in a direction of the optical axis of the laser light emitted by the any first laser; and determines a first speed of the input detection apparatus in the reference plane based on the included angle between the optical axis of the laser light emitted by the any first laser and the reference plane and the speed of the input detection apparatus relative to the reference plane in the direction of the optical axis of the laser light emitted by the any first laser, and determines the first displacement of the input detection apparatus in the reference plane based on the first speed.

With reference to the first aspect or with reference to the first possible implementation of the first aspect, in a second possible implementation, the processor may separately determine distances between laser emission spots of all the second lasers and laser reflection spots of the reference plane based on the self-mixing interference signals generated by all the second lasers, and determine, based on the distances between the laser emission spots of all the second lasers and the laser reflection spots of the reference plane and the relative position information between the at least two second lasers, an included angle between an optical axis of laser light emitted by any second laser and the reference plane. The processor further determines, based on a self-mixing interference signal generated by the any second laser, a speed of the input detection apparatus relative to the reference plane in a direction of the optical axis of the laser light emitted by the any second laser; and determines a second speed of the input detection apparatus in the reference plane based on the included angle between the optical axis of the laser light emitted by the any second laser and the reference plane and the speed of the input detection apparatus relative to the reference plane in the direction of the optical axis of the laser light emitted by the any second laser, and determines the second displacement of the input detection apparatus in the reference plane based on the second speed.

With reference to the first aspect or with reference to any one of the foregoing possible implementations of the first aspect, in a third possible implementation, the processor may further determine first tilt information of the input detection apparatus relative to a first plane based on the self-mixing interference signals generated by all the first lasers and the relative position information between the at least two first lasers, where the first plane is perpendicular to the reference plane and passes through a straight line parallel to the first axial direction; or the processor may further determine second tilt information of the input detection apparatus relative to a second plane based on the self-mixing interference signals generated by all the second lasers and the relative position information between the at least two second lasers, where the second plane is perpendicular to the reference plane and passes through a straight line parallel to the second axial direction. In an embodiment, a tilt angle of a pen head is measured by using tilt information of the input detection apparatus relative to planes. The tilt angle of the pen head may be used to adjust a concentration of ink strokes displayed by a terminal connected to the input detection apparatus during writing or drawing with the input detection apparatus, to implement writing brush/painting brush-level stroking and writing experience of the input detection apparatus.

With reference to the third possible implementation of the first aspect, in a fourth possible implementation, that the processor may further determine first tilt information of the input detection apparatus relative to a first plane based on the self-mixing interference signals generated by all the first lasers and the relative position information between the at least two first lasers is specifically implemented as:

The processor separately determines the distances between the laser emission spots of all the first lasers and the laser reflection spots of the reference plane based on the self-mixing interference signals generated by all the first lasers; determines, based on the distances between the laser emission spots of all the first lasers and the laser reflection spots of the reference plane and the relative position information between the at least two first lasers, the included angle between the optical axis of the laser light emitted by the any first laser and the reference plane; and determines the first tilt information of the input detection apparatus relative to the first plane based on the included angle between the optical axis of the laser light emitted by the any first laser and the reference plane and the relative position information between the at least two first lasers.

With reference to the third possible implementation of the first aspect or with reference to the fourth possible implementation of the first aspect, in a fifth possible implementation, that the processor may further determine second tilt information of the input detection apparatus relative to the second plane based on the self-mixing interference signals generated by all the second lasers and the relative position information between the at least two second lasers is specifically implemented as:

The processor separately determines the distances between the laser emission spots of all the second lasers and the laser reflection spots of the reference plane based on the self-mixing interference signals generated by all the second lasers; determines, based on the distances between the laser emission spots of all the second lasers and the laser reflection spots of the reference plane and the relative position information between the at least two second lasers, the included angle between the optical axis of the laser light emitted by the any second laser and the reference plane; and determines the second tilt information of the input detection apparatus relative to the second plane based on the included angle between the optical axis of the laser light emitted by the any second laser and the reference plane and the relative position information between the at least two second lasers.

With reference to any one of the first aspect or the foregoing possible implementations of the first aspect, in a sixth possible implementation, the processor may further determine a distance between the input detection apparatus and the reference plane based on the self-mixing interference signals generated by all the first lasers and the relative position information between the at least two first lasers, or determine a distance between the input detection apparatus and the reference plane based on the self-mixing interference signals generated by all the second lasers and the relative position information between the at least two second lasers. Different from the conventional technology in which a mouse distinguishes between a pen-down and a pen-up through pressing and releasing of a left button area, the input detection apparatus in an embodiment may identify the pen-down and the pen-up based on the distance between the input detection apparatus and the reference plane, and may perform handwriting or drawing without holding down the left button area, to achieve experience similar to that of natural writing or drawing by a user holding a pen.

With reference to the sixth possible implementation of the first aspect, in a seventh possible implementation, that the processor may further determine a distance between the input detection apparatus and the reference plane based on the self-mixing interference signals generated by all the first lasers and the relative position information between the at least two first lasers is specifically implemented as:

The processor separately determines the distances between the laser emission spots of all the first lasers and the laser reflection spots of the reference plane based on the self-mixing interference signals generated by all the first lasers, and determines, based on the distances between the laser emission spots of all the first lasers and the laser reflection spots of the reference plane and the relative position information between the at least two first lasers, the included angle between the optical axis of the laser light emitted by the any first laser and the reference plane; and determines the distance between the input detection apparatus and the reference plane based on a distance between a laser emission spot of any laser and the laser reflection spot of the reference plane and an included angle between an optical axis of laser light emitted by the any laser and the reference plane.

With reference to the first aspect or with reference to any one of the foregoing possible implementations of the first aspect, in an eighth possible implementation, the input detection apparatus further includes a beam coupler corresponding to each laser, where each laser is coupled to the corresponding beam coupler, and the beam coupler may converge laser light emitted by a corresponding laser and then emit the converged laser light, and converge and feed back laser light obtained after being reflected by the reference plane to a resonant cavity of the laser corresponding to the beam coupler. By implementing an embodiment, intensity of emergent laser light and returning laser light can be increased.

With reference to the first aspect or with reference to any one of the foregoing possible implementations of the first aspect, in a ninth possible implementation, the input detection apparatus further includes a driver corresponding to each laser, where the driver is coupled to the corresponding laser, and the driver may output a drive current to the corresponding laser to drive the corresponding laser to emit the laser light.

With reference to the first aspect or with reference to any one of the foregoing possible implementations of the first aspect, in a tenth possible implementation, the input detection apparatus further includes a photodetector and a transconductance amplifier that correspond to each laser, where an input end of the photodetector is coupled to the corresponding laser, and the photodetector may obtain an optical power signal of the corresponding laser, and convert the optical power signal into a photocurrent; an input end of the transconductance amplifier is coupled to an output end of the photodetector, and the transconductance amplifier may receive the photocurrent outputted by the photodetector, and convert and amplify the photocurrent into a voltage signal; and an output end of the transconductance amplifier is coupled to the processor, and the processor uses the voltage signal outputted by the transconductance amplifier as a self-mixing interference signal generated by the laser corresponding to the transconductance amplifier. An embodiment provides another manner of obtaining a self-mixing interference signal of a laser. An effect of obtaining the self-mixing interference signal of the laser by adding a photodetector is better than an effect of obtaining the self-mixing interference signal of the laser by directly using a processor, so that accuracy is higher.

With reference to the first aspect or with reference to the first possible implementation of the first aspect, in an eleventh possible implementation, the input detection apparatus further includes a wireless communication module, and the wireless communication module is coupled to the processor; and the wireless communication module may establish a connection to an electronic device, and send the first displacement and the second displacement of the input detection apparatus in the reference plane to the electronic device, where the first displacement and the second displacement may jointly indicate (i.e., instruct) the electronic device to generate a first response parameter.

With reference to the first aspect, with reference to the first possible implementation of the first aspect, or with reference to the eleventh possible implementation of the first aspect, in a twelfth possible implementation, the processor may further generate a first response parameter based on the first displacement and the second displacement of the input detection apparatus in the reference plane; and send the first response parameter to the electronic device through the wireless communication module coupled to the processor, where the first response parameter may indicate (i.e., instruct) the electronic device to perform an input response.

With reference to the third possible implementation of the first aspect to the fifth possible implementation of the first aspect, in a thirteenth possible implementation, the input detection apparatus further includes a wireless communication module, and the wireless communication module is coupled to the processor; and the wireless communication module may establish a connection to an electronic device, send the first displacement and the second displacement of the input detection apparatus in the reference plane, the first tilt information of the input detection apparatus relative to the first plane, or the second tilt information of the input detection apparatus relative to the second plane to the electronic device, where the first displacement, the second displacement, the first tilt information, or the second tilt information may jointly indicate the electronic device to generate a first response parameter.

With reference to the third possible implementation of the first aspect to the fifth possible implementation of the first aspect, in a fourteenth possible implementation, the processor may further generate a second response parameter based on the first displacement and the second displacement of the input detection apparatus in the reference plane, the first tilt information of the input detection apparatus relative to the first plane, or the second tilt information of the input detection apparatus relative to the second plane; and send the second response parameter to the electronic device through the wireless communication module coupled to the processor, where the second response parameter may indicate the electronic device to perform an input response.

With reference to the sixth possible implementation of the first aspect and the seventh possible implementation of the first aspect, in a fifteenth possible implementation, the input detection apparatus further includes a wireless communication module, and the wireless communication module is coupled to the processor; and the wireless communication module may establish a connection to an electronic device, and send the distance between the input detection apparatus and the reference plane to the electronic device; when the distance between the input detection apparatus and the reference plane is greater than a preset threshold, may indicate the electronic device to generate a third response parameter, or when the distance between the input detection apparatus and the reference plane is less than the preset threshold, may indicate the electronic device to generate a fourth response parameter.

With reference to the sixth possible implementation of the first aspect and the seventh possible implementation of the first aspect, in a sixteenth possible implementation, the processor may further generate a third response parameter when the distance between the input detection apparatus and the reference plane is greater than a preset threshold, or generate a fourth response parameter when the distance between the input detection apparatus and the reference plane is less than the preset threshold; and send the third response parameter or the fourth response parameter to the electronic device through the wireless communication module coupled to the processor, where the third response parameter or the fourth response parameter may indicate the electronic device to perform an input response.

With reference to the first aspect or with reference to any one of the foregoing possible implementations of the first aspect, in a seventeenth possible implementation, the foregoing all lasers are vertical-cavity surface-emitting lasers VCSELs. Implementation of an embodiment has low power consumption.

With reference to the seventeenth possible implementation of the first aspect, in an eighteenth possible implementation, a microlens is integrated on a surface of each of the foregoing all lasers, and the microlens can improve intensity of laser light.

According to a second aspect, an embodiment provides an input detection apparatus. The input detection apparatus includes lasers and a processor. The lasers include a first laser, a second laser, and a third laser. The first laser and the second laser are disposed in a first axial direction, and the second laser and the third laser are disposed in a second axial direction. To be specific, the second laser is disposed in both the first axial direction and the second axial direction. The first axial direction is perpendicular to the second axial direction, and the first laser, the second laser, and the third laser are all coupled to the processor. The laser may emit laser light, and generate a self-mixing interference signal when the laser light is reflected into a resonant cavity of the laser through a reference plane. The processor may determine a first displacement of the input detection apparatus in the reference plane based on the self-mixing interference signals generated by the first laser and the second laser and relative position information between the first laser and the second laser. The processor may further determine a second displacement of the input detection apparatus in the reference plane based on the self-mixing interference signals generated by the second laser and the third laser and relative position information between the second laser and the third laser. The processor may further determine a movement path of the input detection apparatus in the reference plane based on the first displacement and the second displacement of the input detection apparatus in the reference plane. In an embodiment, the displacements of the input detection apparatus are measured by using laser self-mixing interference. Different from the first aspect and the embodiments with reference to the first aspect, in an embodiment, only three lasers may be required to resolve a problem that writing experience is poor because a left button area of a mouse in the conventional technology needs to be held down to perform handwriting or drawing based on implementation of a mouse control function, and experience similar to that of natural writing or drawing by a user holding a pen is achieved.

With reference to the second aspect, in a first possible implementation, that the processor may determine a first displacement of the input detection apparatus in the reference plane based on the self-mixing interference signals generated by the first laser and the second laser and relative position information between the first laser and the second laser is specifically implemented as:

The processor determines a distance between a laser emission spot of the first laser and a laser reflection spot of the reference plane based on the self-mixing interference signal generated by the first laser, and determines a distance between a laser emission spot of the second laser and the laser reflection spot of the reference plane based on the self-mixing interference signal generated by the second laser. The processor determines, based on the distance between the laser emission spot of the first laser and the laser reflection spot of the reference plane, the distance between the laser emission spot of the second laser and the laser reflection spot of the reference plane, and the relative position information between the first laser and the second laser, an included angle between an optical axis of laser light emitted by the first laser and the reference plane. The processor further determines, based on the self-mixing interference signal generated by the first laser, a speed of the input detection apparatus relative to the reference plane in a direction of the optical axis of the laser light emitted by the first laser. The processor determines a first speed of the input detection apparatus in the reference plane based on the included angle between the optical axis of the laser light emitted by the first laser and the reference plane and the speed relative to the reference plane in the direction of the optical axis of the laser light emitted by the first laser, and determines the first displacement of the input detection apparatus in the reference plane based on the first speed.

With reference to the second aspect, in a second possible implementation, that the processor may determine a second displacement of the input detection apparatus in the reference plane based on the self-mixing interference signals generated by the second laser and the third laser and relative position information between the second laser and the third laser is specifically implemented as:

The processor determines a distance between a laser emission spot of the second laser and a laser reflection spot of the reference plane based on the self-mixing interference signal generated by the second laser, and determines a distance between a laser emission spot of the third laser and the laser reflection spot of the reference plane based on the self-mixing interference signal generated by the third laser. The processor determines, based on the distance between the laser emission spot of the second laser and the laser reflection spot of the reference plane, the distance between the laser emission spot of the third laser and the laser reflection spot of the reference plane, and the relative position information between the second laser and the third laser, an included angle between an optical axis of laser light emitted by the third laser and the reference plane. The processor further determines, based on the self-mixing interference signal generated by the third laser, a speed of the input detection apparatus relative to the reference plane in a direction of the optical axis of the laser light emitted by the third laser. The processor determines a second speed of the input detection apparatus in the reference plane based on the included angle between the optical axis of the laser light emitted by the third laser and the reference plane and the speed relative to the reference plane in the direction of the optical axis of the laser light emitted by the third laser, and determines the second displacement of the input detection apparatus in the reference plane based on the second speed.

With reference to the second aspect or with reference to any one of the foregoing possible implementations of the second aspect, in a third possible implementation, the processor may further determine first tilt information of the input detection apparatus relative to a first plane based on the self-mixing interference signal generated by the first laser, the self-mixing interference signal generated by the second laser, and the relative position information between the first laser and the second laser, where the first plane is perpendicular to the reference plane and passes through a straight line parallel to the first axial direction; or, the processor may further determine second tilt information of the input detection apparatus relative to a second plane based on the self-mixing interference signal generated by the second laser, the self-mixing interference signal generated by the third laser, and the relative position information between the second laser and the third laser, where the second plane is perpendicular to the reference plane and passes through a straight line parallel to the second axial direction. Different from the embodiment of the first aspect with reference to the third possible implementation, in an embodiment, only three lasers may be required to measure tilt information of the input detection apparatus relative to planes. The tilt information may be used for measuring a tilt angle of a pen head. The tilt angle of the pen head may be used to adjust a concentration of ink strokes displayed by a terminal connected to the input detection apparatus during writing or drawing with the input detection apparatus, to implement writing brush/painting brush-level stroking and writing experience of the input detection apparatus.

With reference to the third possible implementation of the second aspect, in a fourth possible implementation, that the processor may further determine first tilt information of the input detection apparatus relative to a first plane based on the self-mixing interference signal generated by the first laser, the self-mixing interference signal generated by the second laser, and the relative position information between the first laser and the second laser is specifically implemented as:

The processor determines a distance between a laser emission spot of the first laser and a laser reflection spot of the reference plane based on the self-mixing interference signal generated by the first laser, and determines a distance between a laser emission spot of the second laser and the laser reflection spot of the reference plane based on the self-mixing interference signal generated by the second laser. The processor determines, based on the distance between the laser emission spot of the first laser and the laser reflection spot of the reference plane, the distance between the laser emission spot of the second laser and the laser reflection spot of the reference plane, and the relative position information between the first laser and the second laser, an included angle between an optical axis of laser light emitted by the first laser and the reference plane; and determines the first tilt information of the input detection apparatus relative to the first plane based on the included angle between the optical axis of the laser light emitted by the first laser and the reference plane and the relative position information between the first laser and the second laser.

With reference to the third possible implementation of the second aspect or with reference to the fourth possible implementation of the first aspect, in a fifth possible implementation, that the processor may further determine second tilt information of the input detection apparatus relative to a second plane based on the self-mixing interference signal generated by the second laser, the self-mixing interference signal generated by the third laser, and the relative position information between the second laser and the third laser is specifically implemented as:

The processor determines a distance between a laser emission spot of the second laser and a laser reflection spot of the reference plane based on the self-mixing interference signal generated by the second laser, and determines a distance between a laser emission spot of the third laser and the laser reflection spot of the reference plane based on the self-mixing interference signal generated by the third laser. The processor determines, based on the distance between the laser emission spot of the second laser and the laser reflection spot of the reference plane, the distance between the laser emission spot of the third laser and the laser reflection spot of the reference plane, and the relative position information between the second laser and the third laser, an included angle between an optical axis of laser light emitted by the third laser and the reference plane; and determines the second tilt information of the input detection apparatus relative to the second plane based on the included angle between the optical axis of the laser light emitted by the third laser and the reference plane and the relative position information between the second laser and the third laser.

With reference to any one of the second aspect or the foregoing possible implementations of the second aspect, in a sixth possible implementation, the processor may further determine a distance between the input detection apparatus and the reference plane based on the self-mixing interference signal generated by the first laser, the self-mixing interference signal generated by the second laser, and the relative position information between the first laser and the second laser, or determine a distance between the input detection apparatus and the reference plane based on the self-mixing interference signal generated by the second laser, the self-mixing interference signal generated by the third laser, and the relative position information between the second laser and the third laser. Different from the embodiment of the first aspect with reference to the sixth possible implementation, in an embodiment, only three lasers may be required to measure the distance between the input detection apparatus and the reference plane, a pen-down and a pen-up is identified based on the distance between the input detection apparatus and the reference plane, and handwriting or drawing may be performed without holding down the left button area, to achieve experience similar to that of natural writing or drawing by a user holding a pen.

With reference to the sixth possible implementation of the second aspect, in a seventh possible implementation, that the processor may further determine a distance between the input detection apparatus and the reference plane based on the self-mixing interference signal generated by the first laser, the self-mixing interference signal generated by the second laser, and the relative position information between the first laser and the second laser is specifically implemented as:

The processor determines a distance between a laser emission spot of the first laser and a laser reflection spot of the reference plane based on the self-mixing interference signal generated by the first laser, and determines a distance between a laser emission spot of the second laser and the laser reflection spot of the reference plane based on the self-mixing interference signal generated by the second laser. The processor determines, based on the distance between the laser emission spot of the first laser and the laser reflection spot of the reference plane, the distance between the laser emission spot of the second laser and the laser reflection spot of the reference plane, and the relative position information between the first laser and the second laser, an included angle between an optical axis of laser light emitted by the first laser and the reference plane. The processor determines the distance between the input detection apparatus and the reference plane based on the distance between the laser emission spot of the first laser and the laser reflection spot of the reference plane and the included angle between the optical axis of the laser light emitted by the first laser and the reference plane.

With reference to the second aspect or with reference to any one of the foregoing possible implementations of the second aspect, in an eighth possible implementation, the input detection apparatus further includes a beam coupler corresponding to each laser, where each laser is coupled to the corresponding beam coupler, and the beam coupler may converge laser light emitted by a corresponding laser and then emit the converged laser light, and converge and feed back laser light obtained after being reflected by the reference plane to a resonant cavity of the laser corresponding to the beam coupler. By implementing embodiments, intensity of emergent laser light and returning laser light can be increased.

With reference to the second aspect or with reference to any one of the foregoing possible implementations of the second aspect, in a ninth possible implementation, the input detection apparatus further includes a driver corresponding to each laser, where the driver is coupled to the corresponding laser, and the driver may output a drive current to the corresponding laser to drive the corresponding laser to emit the laser light.

With reference to the second aspect or with reference to any one of the foregoing possible implementations of the second aspect, in a tenth possible implementation, the input detection apparatus further includes a photodetector and a transconductance amplifier that correspond to each laser, where an input end of the photodetector is coupled to the corresponding laser, and the photodetector may obtain an optical power signal of the corresponding laser, and convert the optical power signal into a photocurrent; an input end of the transconductance amplifier is coupled to an output end of the photodetector, and the transconductance amplifier may receive the photocurrent outputted by the photodetector, and convert and amplify the photocurrent into a voltage signal; and an output end of the transconductance amplifier is coupled to the processor, and the processor uses the voltage signal outputted by the transconductance amplifier as the self-mixing interference signal generated by the laser corresponding to the transconductance amplifier. This embodiment provides another manner of obtaining a self-mixing interference signal of a laser. An effect of obtaining the self-mixing interference signal of the laser by adding a photodetector is better than an effect of obtaining the self-mixing interference signal of the laser by directly using a processor, so that accuracy is higher.

With reference to the second aspect or with reference to the first possible implementation of the second aspect, in an eleventh possible implementation, the input detection apparatus further includes a wireless communication module, and the wireless communication module is coupled to the processor; and the wireless communication module may establish a connection to an electronic device, and send the first displacement and the second displacement of the input detection apparatus in the reference plane to the electronic device, where the first displacement and the second displacement may jointly indicate the electronic device to generate a first response parameter.

With reference to the second aspect, with reference to the first possible implementation of the second aspect, or with reference to the eleventh possible implementation of the second aspect, in a twelfth possible implementation, the processor may further generate a first response parameter based on the first displacement and the second displacement of the input detection apparatus in the reference plane; and send the first response parameter to the electronic device through the wireless communication module coupled to the processor, where the first response parameter may indicate the electronic device to perform an input response.

With reference to the third possible implementation of the second aspect to the fifth possible implementation of the second aspect, in a thirteenth possible implementation, the input detection apparatus further includes a wireless communication module, and the wireless communication module is coupled to the processor; and the wireless communication module may establish a connection to an electronic device, send the first displacement and the second displacement of the input detection apparatus in the reference plane and the first tilt information of the input detection apparatus relative to the first plane and/or the second tilt information of the input detection apparatus relative to the second plane to the electronic device, where the first displacement, the second displacement, and the first tilt information or the second tilt information may jointly indicate the electronic device to generate a first response parameter.

With reference to the third possible implementation of the second aspect to the fifth possible implementation of the second aspect, in a fourteenth possible implementation, the processor may further generate a second response parameter based on the first displacement and the second displacement of the input detection apparatus in the reference plane and the first tilt information of the input detection apparatus relative to the first plane or the second tilt information of the input detection apparatus relative to the second plane; and send the second response parameter to the electronic device through the wireless communication module coupled to the processor, where the second response parameter may indicate the electronic device to perform an input response.

With reference to the sixth possible implementation of the second aspect and the seventh possible implementation of the second aspect, in a fifteenth possible implementation, the input detection apparatus further includes a wireless communication module, and the wireless communication module is coupled to the processor; and the wireless communication module may establish a connection to an electronic device, and send the distance between the input detection apparatus and the reference plane to the electronic device; when the distance between the input detection apparatus and the reference plane is greater than a preset threshold, may indicate the electronic device to generate a third response parameter, or when the distance between the input detection apparatus and the reference plane is less than the preset threshold, may indicate the electronic device to generate a fourth response parameter.

With reference to the sixth possible implementation of the second aspect and the seventh possible implementation of the second aspect, in a sixteenth possible implementation, the processor may further generate a third response parameter when the distance between the input detection apparatus and the reference plane is greater than a preset threshold, or generate a fourth response parameter when the distance between the input detection apparatus and the reference plane is less than the preset threshold; and send the third response parameter or the fourth response parameter to the electronic device through the wireless communication module coupled to the processor, where the third response parameter or the fourth response parameter may indicate the electronic device to perform an input response.

With reference to the second aspect or with reference to any one of the foregoing possible implementations of the second aspect, in a seventeenth possible implementation, the foregoing lasers are vertical-cavity surface-emitting lasers VCSELs. Implementation of embodiments has low power consumption.

With reference to the seventeenth possible implementation of the second aspect, in an eighteenth possible implementation, a microlens is integrated on a surface of each of the foregoing lasers, and the microlens can improve intensity of laser light.

According to a third aspect, an embodiment provides an input detection apparatus. The input detection apparatus includes lasers and a processor. The lasers include at least two first lasers disposed in a first axial direction and at least two second lasers disposed in a second axial direction. The first axial direction is perpendicular to the second axial direction. All first lasers and all second lasers are coupled to the processor. The laser may emit laser light, and generate a self-mixing interference signal when the laser light is reflected into a resonant cavity of the laser through a reference plane. The processor may determine first tilt information of the input detection apparatus relative to a first plane based on self-mixing interference signals generated by all the first lasers and relative position information between the at least two first lasers, where the first plane is perpendicular to the reference plane and passes through a straight line parallel to the first axial direction; or the processor may determine second tilt information of the input detection apparatus relative to a second plane based on self-mixing interference signals generated by all the second lasers and relative position information between the at least two second lasers, where the second plane is perpendicular to the reference plane and passes through a straight line parallel to the second axial direction. In an embodiment, a tilt angle of a pen head is measured by using tilt information of the input detection apparatus relative to a plane. The tilt angle of the pen head may be used to adjust a concentration of ink strokes displayed by a terminal connected to the input detection apparatus during writing or drawing with the input detection apparatus, to implement writing brush/painting brush-level stroking and writing experience of the input detection apparatus.

With reference to the third aspect, in a first possible implementation, that the processor may determine first tilt information of the input detection apparatus relative to a first plane based on the self-mixing interference signals generated by all the first lasers and the relative position information between the at least two first lasers is specifically implemented as:

The processor may separately determine the distances between the laser emission spots of all the first lasers and the laser reflection spots of the reference plane based on the self-mixing interference signals generated by all the first lasers; and determine, based on the distances between the laser emission spots of all the first lasers and the laser reflection spots of the reference plane and the relative position information between the at least two first lasers, the included angle between the optical axis of the laser light emitted by the any first laser and the reference plane. The processor determines the first tilt information of the input detection apparatus relative to the first plane based on the included angle between the optical axis of the laser light emitted by the any first laser and the reference plane and the relative position information between the at least two first lasers.

With reference to the third aspect or with reference to the first possible implementation of the third aspect, in a second possible implementation, that the processor may determine second tilt information of the input detection apparatus relative to a second plane based on the self-mixing interference signals generated by all the second lasers and the relative position information between the at least two second lasers is specifically implemented as:

The processor separately determines the distances between the laser emission spots of all the second lasers and the laser reflection spots of the reference plane based on the self-mixing interference signals generated by all the second lasers; determines, based on the distances between the laser emission spots of all the second lasers and the laser reflection spots of the reference plane and the relative position information between the at least two second lasers, the included angle between the optical axis of the laser light emitted by the any second laser and the reference plane; and determines the second tilt information of the input detection apparatus relative to the second plane based on the included angle between the optical axis of the laser light emitted by the any second laser and the reference plane and the relative position information between the at least two second lasers.

With reference to the third aspect or with reference to any one of the foregoing possible implementations of the third aspect, in a third possible implementation, the input detection apparatus further includes a beam coupler corresponding to each laser, where each laser is coupled to the corresponding beam coupler, and the beam coupler may converge laser light emitted by a corresponding laser and then emit the converged laser light, and converge and feed back laser light obtained after being reflected by the reference plane to a resonant cavity of the laser corresponding to the beam coupler. By implementing an embodiment, intensity of laser light can be increased.

With reference to the third aspect or with reference to any one of the foregoing possible implementations of the third aspect, in a fourth possible implementation, the input detection apparatus further includes a driver corresponding to each laser, where the driver is coupled to the corresponding laser, and the driver may output a drive current to the corresponding laser to drive the corresponding laser to emit the laser light.

With reference to the third aspect or with reference to any one of the foregoing possible implementations of the third aspect, in a fifth possible implementation, the input detection apparatus further includes a photodetector and a transconductance amplifier that correspond to each laser, where an input end of the photodetector is coupled to the corresponding laser, and the photodetector may obtain an optical power signal of the corresponding laser, and convert the optical power signal into a photocurrent; an input end of the transconductance amplifier is coupled to an output end of the photodetector, and the transconductance amplifier may receive the photocurrent outputted by the photodetector, and convert and amplify the photocurrent into a voltage signal; and an output end of the transconductance amplifier is coupled to the processor, and the processor uses the voltage signal outputted by the transconductance amplifier as the self-mixing interference signal generated by a laser corresponding to the transconductance amplifier.

With reference to the third aspect or with reference to the first possible implementation of the third aspect, in a sixth possible implementation, the input detection apparatus further includes a wireless communication module, and the wireless communication module is coupled to the processor; and the wireless communication module may establish a connection to an electronic device, and send the first tilt information of the input detection apparatus in the first plane or the second tilt information of the input detection apparatus in the second plane to the electronic device, where the first tilt information or the second tilt information may indicate the electronic device to generate a first response parameter.

With reference to the second possible implementation of the third aspect, in a seventh possible implementation, the processor may further determine a first response parameter of the input detection apparatus based on the first tilt information of the input detection apparatus in the first plane or the second tilt information of the input detection apparatus in the second plane; and send the first response parameter to the electronic device through a wireless communication module coupled to the processor, where the first response parameter may indicate the electronic device to perform an input response.

With reference to the third aspect or with reference to any one of the foregoing possible implementations of the third aspect, in an eighth possible implementation, the foregoing all lasers are vertical-cavity surface-emitting lasers VCSELs. Implementation of an embodiment has low power consumption.

With reference to the eighth possible implementation of the third aspect, in a ninth possible implementation, a microlens is integrated on a surface of each of the foregoing all lasers, and the microlens can improve intensity of laser light.

According to a fourth aspect, an embodiment provides an input detection apparatus. The input detection apparatus includes lasers and a processor. The lasers include at least two first lasers disposed in a first axial direction and at least two second lasers disposed in a second axial direction. The first axial direction is perpendicular to the second axial direction. All first lasers and all second lasers are coupled to the processor. The laser may emit laser light, and generate a self-mixing interference signal when the laser light is reflected into a resonant cavity of the laser through a reference plane. With reference to any one of the first aspect or the foregoing possible implementations of the first aspect, in a sixth possible implementation, the processor may determine a distance between the input detection apparatus and the reference plane based on the self-mixing interference signals generated by all the first lasers and the relative position information between the at least two first lasers, or determine a distance between the input detection apparatus and the reference plane based on the self-mixing interference signals generated by all the second lasers and a relative position between the at least two second lasers. Different from the conventional technology in which a mouse distinguishes between a pen-down and a pen-up through pressing and releasing of a left button area, the input detection apparatus in an embodiment may identify a pen-down and a pen-up based on the distance between the input detection apparatus and the reference plane, and may perform handwriting or drawing without holding down the left button area, to achieve experience similar to that of natural writing or drawing by a user holding a pen.

With reference to the fourth aspect, in a first possible implementation, that the processor may determine a distance between the input detection apparatus and the reference plane based on the self-mixing interference signals generated by all the first lasers and the relative position information between the at least two first lasers is specifically implemented as:

The processor may determine the distances between the laser emission spots of the first lasers and the laser reflection spot of the reference plane based on the self-mixing interference signals generated by all the first lasers, and determine, based on the distances between the laser emission spots of the first lasers and the laser reflection spot of the reference plane and the relative position information between the at least two first lasers, the included angle between the optical axis of the laser light emitted by the any first laser and the reference plane. The processor may determine the distance between the input detection apparatus and the reference plane based on a distance between a laser emission spot of any laser and the laser reflection spot of the reference plane and an included angle between an optical axis of laser light emitted by the any laser and the reference plane.

With reference to the fourth aspect or with reference to the first possible implementation of the fourth aspect, in a second possible implementation, the input detection apparatus further includes a beam coupler corresponding to each laser, where each laser is coupled to the corresponding beam coupler, and the beam coupler may converge laser light emitted by a corresponding laser and then emit the converged laser light, and converge and feed back laser light obtained after being reflected by the reference plane to a resonant cavity of the laser corresponding to the beam coupler. By implementing embodiments, intensity of emergent laser light and returning laser light can be increased.

With reference to the fourth aspect or with reference to any one of the foregoing possible implementations of the fourth aspect, in a third possible implementation, the input detection apparatus further includes a driver corresponding to each laser, where the driver is coupled to the corresponding laser, and the driver may output a drive current to the corresponding laser to drive the corresponding laser to emit the laser light.

With reference to the fourth aspect or with reference to any one of the foregoing possible implementations of the fourth aspect, in a fourth possible implementation, the input detection apparatus further includes a photodetector and a transconductance amplifier that correspond to each laser, where an input end of the photodetector is coupled to the corresponding laser, and the photodetector may obtain an optical power signal of the corresponding laser, and convert the optical power signal into a photocurrent; an input end of the transconductance amplifier is coupled to an output end of the photodetector, and the transconductance amplifier may receive the photocurrent outputted by the photodetector, and convert and amplify the photocurrent into a voltage signal; and an output end of the transconductance amplifier is coupled to the processor, and the processor uses the voltage signal outputted by the transconductance amplifier as the self-mixing interference signal generated by the laser corresponding to the transconductance amplifier.

With reference to the fourth aspect or with reference to the first possible implementation of the fourth aspect, in a fifth possible implementation, the input detection apparatus further includes a wireless communication module, and the wireless communication module is coupled to the processor; and the wireless communication module may establish a connection to an electronic device, and send the distance between the input detection apparatus and the reference plane to the electronic device; and when the distance between the input detection apparatus and the reference plane is greater than a preset threshold, the wireless communication module is configured to indicate the electronic device to generate a first response parameter, or when the distance between the input detection apparatus and the reference plane is not greater than a preset threshold, configured to indicate the electronic device to generate a second response parameter.

With reference to the fourth aspect or with reference to the first possible implementation of the fourth aspect, in a sixth possible implementation, the processor may further generate a first response parameter when the distance between the input detection apparatus and the reference plane is greater than a preset threshold, or generate a second response parameter when the distance between the input detection apparatus and the reference plane is not greater than a preset threshold; and send the first response parameter or the second response parameter to an electronic device through a wireless communication module coupled to the processor, where the first response parameter or the second response parameter may be used for indicating the electronic device to perform an input response.

With reference to the fourth aspect or with reference to any one of the foregoing possible implementations of the fourth aspect, in a seventh possible implementation, the foregoing lasers are vertical-cavity surface-emitting lasers VCSELs. Implementation of embodiments has low power consumption.

With reference to the seventh possible implementation of the fourth aspect, in an eighth possible implementation, a microlens is integrated on a surface of each of the foregoing lasers, and the microlens can improve intensity of emergent laser light and returning laser light.

According to a fifth aspect, an embodiment provides an input device. The input device includes a housing and the input detection apparatus provided with reference to any one of the first aspect or the possible implementations of the first aspect, any one of the second aspect or the possible implementations of the second aspect, any one of the third aspect or the possible implementations of the third aspect, or any one of the fourth aspect or the possible implementations of the fourth aspect.

With reference to the fifth aspect, in a first possible implementation, the input device further includes at least one button. The at least one button may be used to switch an operating mode of the input device.

With reference to the fifth aspect or with reference to the first possible implementation of the fifth aspect, in a second possible implementation, the input device further includes a microphone. The microphone may acquire sound in a preset range of the input device.

With reference to the fifth aspect or with reference to any one of the foregoing possible implementations of the fifth aspect, in a third possible implementation, the input device further includes a touch apparatus. The touch apparatus may receive touch information inputted by a user.

With reference to the fifth aspect or with reference to any one of the foregoing possible implementations of the fifth aspect, in a fourth possible implementation, the housing included in the input device is specifically a pen-shaped housing, and the input detection apparatus is disposed at a tip portion of the pen-shaped housing.

With reference to the fourth possible implementation of the fifth aspect, in a fifth possible implementation, a pen head of the pen-shaped housing is a stylus pen head.

It should be understood that, for implementations and beneficial effects of the foregoing aspects, reference may be made to each other.

DESCRIPTION OF EMBODIMENTS

Figure 1:
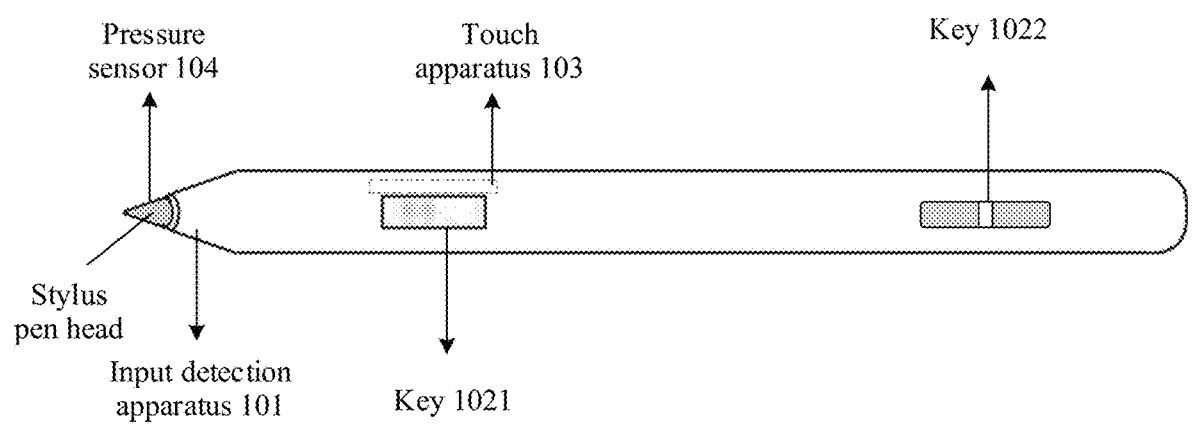
FIG. 1 is a schematic diagram of a structure of an input device according to an embodiment.

An embodiment provides an input device. A displacement of the input device in a reference plane is measured by using a laser, to obtain a movement path of the input device in the reference plane.

In some feasible implementations, the input device may implement a function of a mouse. In a specific implementation, a terminal (for example, a desktop computer, a notebook computer, a tablet computer, a smart screen, or a mobile phone) connected to the input device may move a cursor based on the movement path of the input device in the reference plane when the input device is in a mouse operation mode.

Optionally, in some feasible implementations, the input device may implement a function of a stylus. In a specific implementation, a terminal connected to the input device may display a writing trajectory or a drawing trajectory based on the movement path of the input device in the reference plane when the input device is in a writing and drawing mode. In this case, the input device does not need to hold down a left button area of the mouse as in the conventional technology, and detection of a movement path in a process of writing or drawing may not be limited by a lift-off distance. To be specific, in the process of writing or drawing, even if the input device is raised away from the reference plane, the writing trajectory of the input device can still be tracked.

Optionally, in some feasible implementations, whether the input device is in a mouse operation control mode or the writing and drawing mode may be switched by using a key.

It may be understood that the reference plane varies with different terminals connected to the input device. For example, the input device is connected to a desktop computer or a notebook computer without a touchscreen. In this case, the reference plane may be specifically implemented as a desktop. In another example, if the input device is connected to a notebook computer, a tablet computer, a mobile phone, or the like that has a touchscreen, the reference plane may be specifically implemented as a display screen of the notebook computer, the tablet computer, or the mobile phone.

In summary, the input device in an embodiment may integrate a mouse and a stylus. Based on implementation of a mouse control function, the input device may resolve a problem that experience is poor because a left button area of a mouse in the conventional technology needs to be held down to perform handwriting or drawing. The input device in an embodiment uses a displacement detection method different from that in the conventional technology, and writing or drawing may be performed without holding down the left button area, to achieve experience similar to that of natural writing or drawing by a user holding a pen.

In some feasible implementations, the input device in an embodiment may further identify a tilt angle of the input device (which may be understood as a tilt angle of a pen head). The input device in an embodiment measures the tilt angle of the pen head by determining tilt information of the input device relative to a plane. When the input device is in the writing and drawing mode, the terminal connected to the input device may display different writing trajectories or drawing trajectories based on the tilt angle of the pen head. For example, if the tilt angle of the pen head is small, a trajectory of a written line is displayed as a thin line. If the tilt angle of the pen head is large, a trajectory of a written line is displayed as a thick line. In other words, the terminal may adjust, based on the tilt angle of the pen head, a concentration of ink strokes of the input device in the writing or drawing mode, to implement writing brush/painting brush-level stroking and writing experience of the input device.

In some feasible implementations, the input device in an embodiment may further determine a distance between the input device and the reference plane. A left button area of a mouse in the conventional technology needs to be held down to perform writing or drawing, and the left button area is released to stop writing or drawing. To be specific, in the process of writing or drawing, the mouse in the conventional technology distinguishes between a pen-down and a pen-up through pressing and releasing of the left button area. However, the input device in an embodiment may identify a pen-down and a pen-up based on the distance between the input device and the reference plane. For example, when the distance between the input device and the reference plane is greater than a preset threshold, it indicates a pen-up, and the terminal connected to the input device may display a pen-up prompt. When the distance between the input device and the reference plane is less than the preset threshold, it indicates a pen-down, and the terminal connected to the input device may display a pen-down prompt.

Implementations of the technical solutions are further described below in detail with reference to the accompanying drawings.

FIG. 1 is a schematic diagram of a structure of an input device according to this application. As shown in FIG. 1, an example in which a housing included in the input device is a pen-shaped housing is used in FIG. 1. The input device may include an input detection apparatus 101.

It should be first noted that a shape of the housing of the input device may be similar to a shape of a mouse used currently, or may be a cylindrical shape, or may be similar to a shape of a pen (that is, a pen-shaped housing), or the like. FIG. 1 should be understood as an example in which the housing of the input device is a pen-shaped housing, instead of limiting the shape of the housing of the input device provided in this application.

The input detection apparatus 101 shown in FIG. 1 is disposed at a tip portion of a pen-shaped housing. Optionally, the input detection apparatus may also be disposed on a surface of the pen-shaped housing (not shown in the figure). In an embodiment, a position at which the input detection apparatus is disposed in the input device is not limited.

In some feasible implementations, the input device may further include at least one key (for example, a key 1021 or a key 1022). The key 1021 may switch an operating mode of the input device. For example, the input device may have operating modes such as a mouse control mode, a writing and drawing mode, and the like. The key 1021 may be disposed at a holding position (in other words, a position at which the pen-shaped housing is held by a thumb), for example, at a position 3 centimeters away from a tip. It may be understood that, when the key 1021 of the pen-shaped housing is held by the thumb, a direction of the pen-shaped housing relative to a reference plane may be determined. In other words, the key 1021 may also be used as a positioning device of the pen-shaped housing relative to the reference plane.

Optionally, the key 1022 may be disposed at a barrel portion. For example, if the input device is connected to a display device or a projection device, the key 1022 may control page turning of the display device or the projection device.

Optionally, in some feasible implementations, the input device further includes a microphone. The microphone may collect sound in a preset range of the input device. A size of the preset range is related to the microphone, and is a device attribute of the microphone. Further, the input device may further have a key associated with an operating state of the microphone, to control the operating state of the microphone. For example, when a key associated with the operating state of the microphone is in a pressed state, the microphone is in an operating state. Otherwise, the microphone is in a non-operating state. Optionally, the microphone may be disposed at another end opposite to the tip.

Optionally, in some feasible implementations, the input device may further include a touch apparatus 103. The touch apparatus 103 may be disposed on the barrel portion. For example, the touch apparatus 103 may be in a same horizontal plane as the key 1021. It may be understood that, swiping of a finger on the touch apparatus 103 may implement a function equivalent to that of a mouse wheel, for example, swiping and page turning.

Further, in some feasible implementations, the input device further includes a pressure sensor 104. The pressure sensor 104 is disposed at a pen head, and may detect pressure (in other words, a writing force) of the tip of the pen-shaped housing contacting the reference plane.

Optionally, the pen head of the pen-shaped housing is a stylus pen head, and may be used for a touch operation of a touchscreen (for example, a tablet computer, a notebook computer screen, or a mobile phone).

The input device provided in an embodiment may further include a camera (not shown in the figure). The camera may be disposed at the barrel portion, and can recognize a text, a picture, and the like. It may be understood that the input device provided in an embodiment may be equipped with different components such as a microphone, a camera, a button, a touch apparatus, a speaker, and the like according to a function of the input device based on the input detection apparatus 101. A specific component is not limited in an embodiment.

A specific structure of the input detection apparatus provided in an embodiment is described below in detail with reference to the accompanying drawings.

Figure 2:
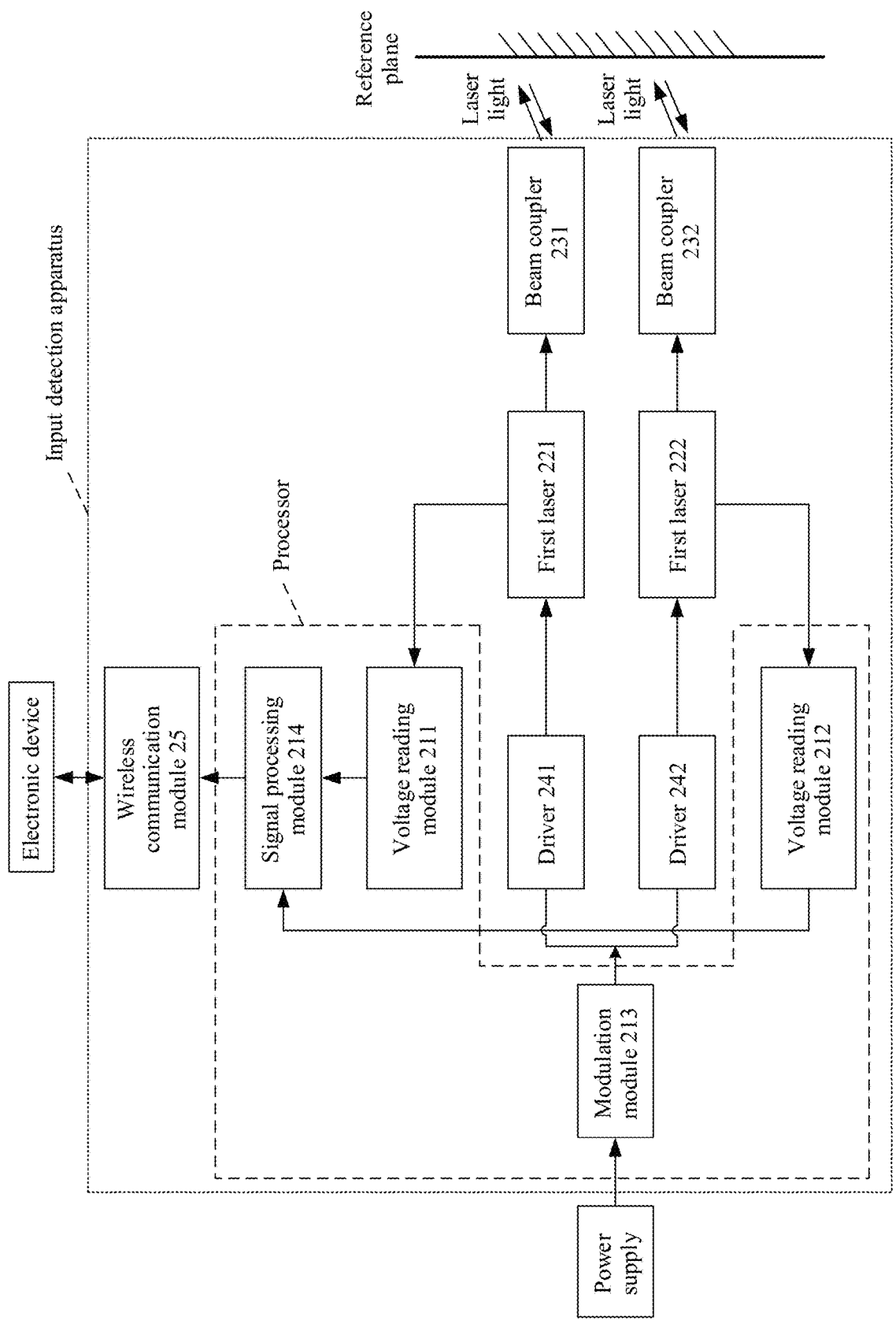
FIG. 2 is a partial structural block diagram of an input detection apparatus according to an embodiment.

FIG. 2 is a partial structural block diagram of an input detection apparatus according to an embodiment. As shown in FIG. 2, the input detection apparatus includes a processor and at least two first lasers (for example, a first laser 221 and a first laser 222). The first laser 221 and the first laser 222 are disposed in a first axial direction.

It should be first noted that, in this application, to better reflect each data stream inputted into the input detection apparatus, the processor is divided into a plurality of units (for example, a voltage reading module 211, a voltage reading module 212, a modulation module 213, a signal processing module 214, and the like) based on functions. However, during actual product application, the processor in this application is mainly embodied as at least one chip or a plurality of chips that can establish a communication connection. For example, the processor may be a microcontroller unit (MCU), a central processing unit (CPU), another general purpose processor, a digital signal processor (DSP), an application-specific integrated circuit (ASIC), a field-programmable gate array (FPGA) or another programmable logic device, a discrete gate or transistor logic device, a discrete hardware component, or the like.

In some feasible implementations, the first laser 221 and the first laser 222 may be vertical-cavity surface-emitting lasers VCSEL, and power consumption is low. Further, a microlens may be integrated on each of a surface of the first laser 221 and a surface of the first laser 222. The microlens can improve coupling efficiency of laser light (in other words, improve intensity of laser light), and improve intensity of self-mixing interference signals of lasers, to be specific, enhance intensity of emergent laser light and returning laser light of the laser. For example, the microlens may be molded above the VCSEL in a direct plastic packaging manner to form a lens; or the microlens may be formed above the VCSEL through 3D printing; or the VCSEL may be coated with a photoresist, and then irradiated and etched with ultraviolet light, to implement lens surface processing by controlling light intensity, or the lens may be manufactured on a surface of the VCSEL by directly performing semiconductor growth and etching at a wafer level.

Optionally, the first laser 221 and the first laser 222 may be integrated into one chip.

The processor (for example, the voltage reading module 211) is coupled to the first laser 221, and the processor (for example, the voltage reading module 212) is coupled to the first laser 222.

The "coupling" described in this application is a direct connection or an indirect connection. For example, that I is connected to J may not only be that I is directly connected to J, but also be that I is indirectly connected to J by using one or more other electrical components. For example, it may be that I is directly connected to K, and K is directly connected to J. In this way, I is connected to J by K.

During specific implementation, the voltage reading module 211 may obtain a self-mixing interference signal generated by the first laser 221, for example, read a voltage at an output end of the first laser 221. Similarly, the voltage reading module 212 may obtain a self-mixing interference signal generated by the first laser 222, for example, read a voltage at an output end of the first laser 222.

It may be understood that, after output light of a laser is reflected by an external object (for example, a reference plane), the output light is fed back to a resonant cavity of the laser again. This part of feedback light carrying information about the external object interferes with light in a cavity of the laser, and changes an output characteristic (for example, a voltage and an optical power) of the laser. An output characteristic of the laser is the self-mixing interference signal generated by the laser.

There is also a signal processing module 214 inside the processor, and an input end of the signal processing module 214 is coupled to the voltage reading module 211 and the voltage reading module 212.

To increase the intensity of laser light, in some feasible implementations, the input detection apparatus may further include all beam couplers (for example, a beam coupler 231 and a beam coupler 232) corresponding to all lasers. The first laser 221 is coupled to the beam coupler 231, and the first laser 222 is coupled to the beam coupler 232. The beam coupler 231 may converge laser light emitted by the first laser 221 and then transmit the converged laser light, and converge and feed back the laser light obtained after reflection by the reference plane to a resonant cavity of the first laser 221, so that the first laser 221 generates a self-mixing interference effect. Similarly, the beam coupler 232 may converge laser light emitted by the first laser 222 and then transmit the converged laser light, and converge and feed back the laser light obtained after reflection by the reference plane to a resonant cavity of the first laser 222, so that the first laser 222 generates a self-mixing interference effect.

In some feasible implementations, the input detection apparatus further includes all drivers (for example, a driver 241 and a driver 242) corresponding to all the lasers. An output end of the driver 241 is coupled to the first laser 221, an output end of the driver 242 is coupled to the first laser 222, and both an input end of the driver 241 and an input end of the driver 242 are coupled to the processor (for example, the modulation module 213). The driver 241 is equipped with a direct current DC value for the first laser 221 to operate, and the driver 242 is equipped with a direct current DC value for the first laser 222 to operate. In addition, an input end of the modulation module 213 is coupled with a power supply. Based on the power supply, the modulation module 213 may modulate and output a triangular wave. Therefore, the driver 241 superimposes the triangular wave on a DC value for the first laser 221 to operate to form a drive current of the first laser 221, and transmits the drive current to the first laser 221, to perform triangular wave modulation on the first laser 221, so that the first laser 221 can emit laser light. Similarly, the driver 242 also superimposes the triangular wave on a DC value for the first laser 222 to operate to form a drive current of the first laser 222, and transmits the drive current to the first laser 222, to perform triangular wave modulation on the first laser 222, so that the first laser 222 can emit laser light. Optionally, to compensate for non-linearity of a laser wavelength changing with a current, the modulation module 213 may output a pre-emphasis triangular wave, to be specific, the modulation module 213 may calibrate an output of the triangular wave in real time.

In some feasible implementations, the input detection apparatus further includes a wireless communication module 25. The wireless communication module 25 is coupled to the processor (for example, the signal processing module 214). The wireless communication module 25 may establish a communication connection to the electronic device, to send output information of the signal processing module 214 to the electronic device, or send response information of the electronic device to the signal processing module 214. In other words, the wireless communication module 25 enables the input detection apparatus to establish communication with the electronic device.

Figure 3:
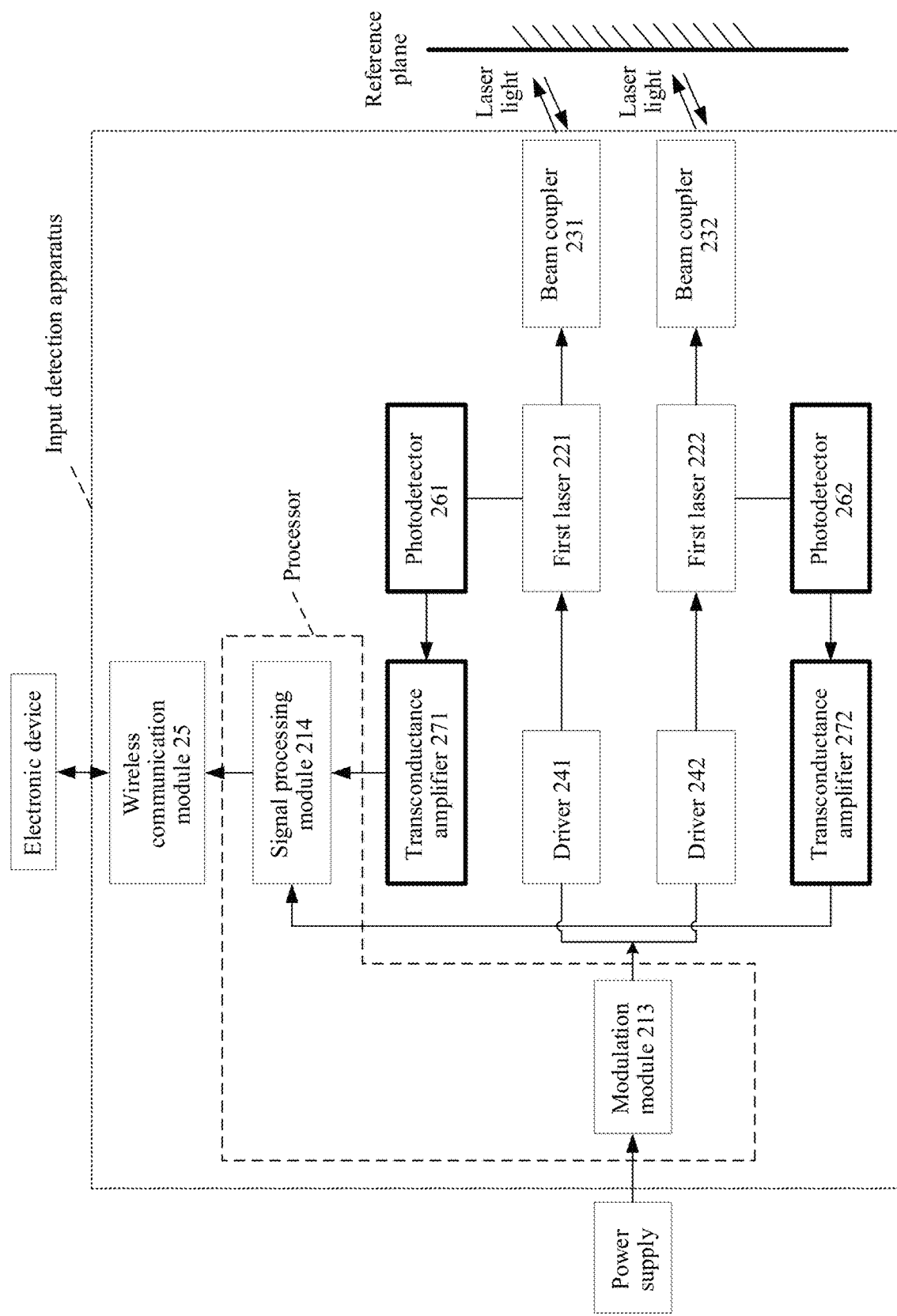
FIG. 3 is another partial structural block diagram of an input detection apparatus according to an embodiment.

Optionally, in some feasible implementations, in addition to the processor in FIG. 2 directly obtaining the self-mixing interference signals of the lasers, the self-mixing interference signals of the lasers may be obtained by using a photodetector. FIG. 3 is another structural block diagram of an input detection apparatus according to an embodiment. As shown in FIG. 3, in the foregoing embodiment described with reference to FIG. 2, the input detection apparatus in an embodiment may further include all photodetectors (for example, a photodetector 261 and a photodetector 262) corresponding to all lasers, a transconductance amplifier 271 corresponding to the photodetector 261, and a transconductance amplifier 272 corresponding to the photodetector 262.

An input end of the photodetector 261 is coupled to a first laser 221, an output end of the photodetector 261 is coupled to an input end of the transconductance amplifier 271, and an output end of the transconductance amplifier 271 is coupled to a processor (for example, a signal processing module 214). Similarly, an input end of the photodetector 262 is coupled to a first laser 222, an output end of the photodetector 262 is coupled to the input end of the transconductance amplifier 272, and an output end of the transconductance amplifier 272 is coupled to the signal processing module 214.

It may be understood that, the difference of the input detection apparatus shown in FIG. 3 from an input detection apparatus shown in FIG. 2 is that the input detection apparatus shown in FIG. 3 obtains a self-mixing interference signal of a laser by using a photodetector. The photodetector may convert optical power when the laser generates a self-mixing interference effect into a current, and the transconductance amplifier may convert the current into a voltage.

Optionally, an alternating-current coupled voltage amplifier may be further disposed in the processor. The voltage amplifier may further amplify a voltage outputted by the transconductance amplifier. Through implementation of an embodiment, an effect of obtaining the self-mixing interference signal of the laser by adding a photodetector is better than an effect of obtaining the self-mixing interference signal of the laser by directly using a processor, so that accuracy is higher.

Optionally, the transconductance amplifier 271 and the transconductance amplifier 272 may be built in a same processor or different processors, or may be separately disposed with a transconductance amplifier independent of the processor.

It should be noted that, in addition to the first laser 221 and the first laser 222, the input detection apparatus further includes at least two second lasers (not shown in the figure). It may be understood that a circuit structure of a first laser is also applicable to a second laser. For example, the second laser may also be coupled to a beam coupler, a driver, a photodetector, a transconductance amplifier, or the like. For specific implementation, refer to the description of the first laser. Details are not described herein again.

A specific implementation principle of the input detection apparatus provided in embodiments is described below in detail with reference to FIG. 4 to FIG. 11.

Figure 4:
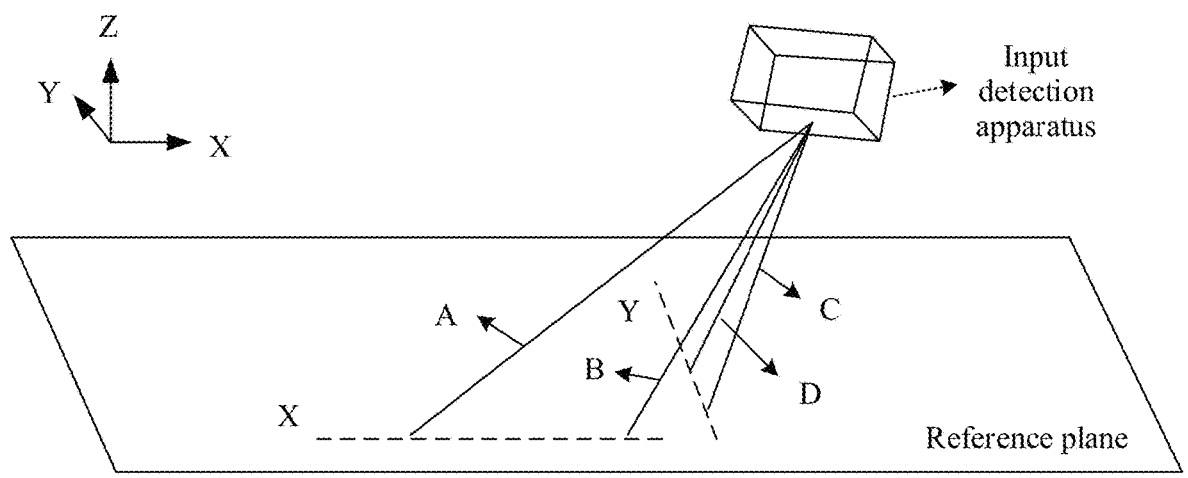
FIG. 4 is a three-dimensional schematic diagram of an input detection apparatus according to an embodiment.
Figure 5:
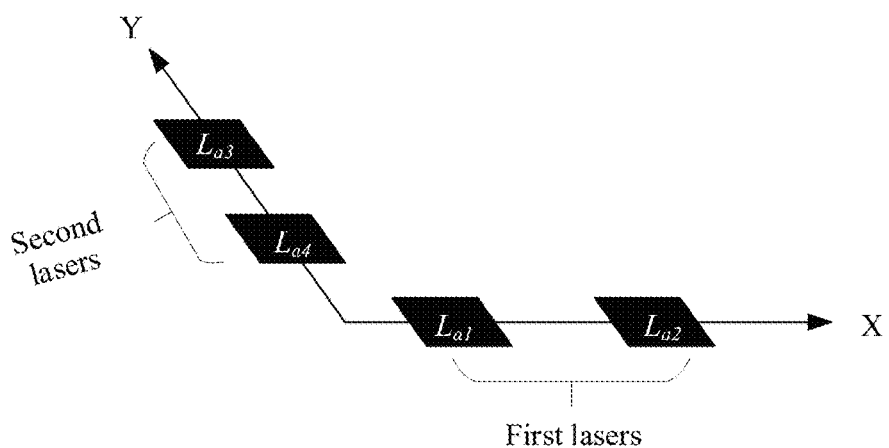
FIG. 5 is a schematic diagram of placement of a laser according to an embodiment.
Figure 6:
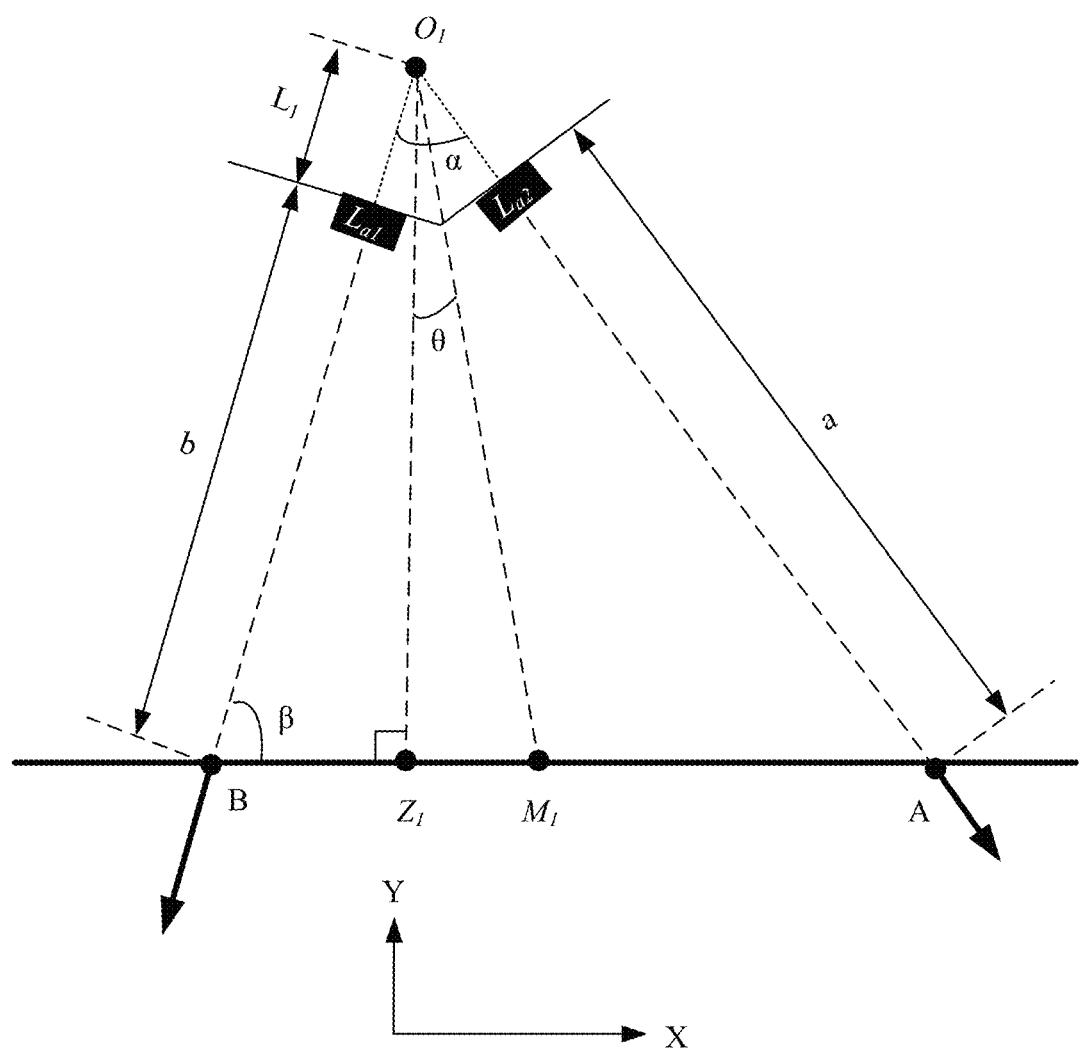
FIG. 6 is a schematic diagram of configuration of an input detection apparatus in an x-z plane according to an embodiment.

FIG. 4 is a three-dimensional schematic diagram of an input detection apparatus according to an embodiment. As shown in FIG. 4, there are at least two laser beams between the input detection apparatus and a reference plane, to be specific, at least two lasers are disposed in the input detection apparatus, and the at least two lasers may include at least two first lasers disposed in a first axial direction (in other words, an x-axis direction). A position between the at least two first lasers may be shown in FIG. 5. A first laser $L_{a1}$ and a first laser $L_{a2}$ are separately disposed on two substrates. In this case, refer to FIG. 6 for a schematic diagram of configuration of the input detection apparatus in an x-z plane. As shown in FIG. 6, the first laser $L_{a1}$ emits a first laser beam to the reference plane. The first laser beam intersects the reference plane at a point B. The point B is a laser reflection spot of the first laser beam in the reference plane. Similarly, the first laser $L_{a2}$ emits a second laser beam to the reference plane. The second laser beam intersects the reference plane at a point A. The point A is a laser reflection spot of the second laser beam in the reference plane. It may be understood that there is a first included angle between a substrate on which the first laser $L_{a1}$ is located and a substrate on which the first laser $L_{a2}$ is located, and an included angle between the first laser beam emitted by the first laser $L_{a1}$ and the second laser beam emitted by the first laser $L_{a2}$ is a second included angle. In this case, a sum of the first included angle and the second included angle is 180°. Optionally, an included angle range of the second included angle may be 20° to 45°, and an included angle range of the first included angle may be 1350 to 160°.

A distance from a laser emission spot of the first laser $L_{a1}$ to the point B in the reference plane is denoted as b, and a distance from a laser emission spot of the first laser $L_{a2}$ to the point A in the reference plane is denoted as a.

An inverse extension line of the first laser beam emitted by the first laser $L_{a1}$ to the reference plane intersects with an inverse extension line of the second laser beam emitted by the first laser $L_{a2}$ at a virtual point $O_1$. A distance from the virtual point $O_1$ to the point A in the reference plane is denoted as $L_{O_1A}$, a distance from the virtual point $O_1$ to the point B in the reference plane is denoted as $L_{O_1B}$, and a distance from the virtual point $O_1$ to the first laser $L_{a2}$ or from the virtual point $O_1$ to the first laser $L_{a1}$ is denoted as $L_1$.

In a triangle $O_1AB$, according to trigonometric functions, it may be obtained that a distance $L_{AB}$ between the reflection point A and the reflection point B in the reference plane is:

$$L_{AB} = \sqrt{L_{O_1A}^2 + L_{O_1B}^2 - 2L_{O_1A}L_{O_1B}\cos\alpha} \qquad \text{Formula 1}$$

α is an included angle between the inverse extension line of the first laser beam emitted by the first laser $L_{a1}$ to the reference plane and the inverse extension line of the second laser beam emitted by the first laser $L_{a2}$. α is a preset fixed known value, and is determined by a relative location between the first laser $L_{a1}$ and the first laser $L_{a2}$. α is correspondingly fixed after an included angle between the first laser $L_{a1}$ and the first laser $L_{a2}$ is fixed.

The distance $L_{O_1A}$ between the virtual point $O_1$ and the point A in the reference plane may be calculated by using the following formula:

$$L_{O_1A} = b + L_1 \qquad \text{Formula 2}$$

The distance $L_{O_1B}$ between the virtual point $O_1$ and the point B in the reference plane may be calculated by using the following formula:

$$L_{O_1B} = a + L_1 \qquad \text{Formula 3}$$

Further, the distance between the first laser $L_{a1}$ and the first laser $L_{a2}$ and α jointly determine a distance $L_1$ between the virtual point $O_1$ and each laser (for example, the first laser $L_{a1}$ or the first laser $L_{a2}$). In other words, $L_1$ is correspondingly fixed after the included angle and the distance between the first laser $L_{a1}$ and the first laser $L_{a2}$ are fixed. That is, $L_1$ is also a preset fixed known value.

The distance a between the laser emission spot of the first laser $L_{a2}$ and the point A in the reference plane and the distance b between the laser emission spot of the first laser $L_{a1}$ and the point B in the reference plane are values obtained through measurement by the input detection apparatus. During specific implementation, the processor (for example, a signal processing module) may determine the distance a between the laser emission spot of the first laser $L_{a2}$ and the laser reflection spot in the reference plane based on a voltage at an output end of the first laser $L_{a2}$ read by a voltage reading module or based on an output voltage of a transconductance amplifier. Similarly, the signal processing module may also determine the distance b between the laser emission spot of the first laser $L_{a1}$ and the laser reflection spot in the reference plane based on a voltage of an output end of the first laser $L_{a1}$ read by a voltage reading module or based on an output voltage of a transconductance amplifier.

It may be understood that a frequency (in other words, an SMI frequency (Self Mixing Interference)) of a self-mixing interference signal (for example, a voltage at an output end of a laser or an output voltage of a transconductance amplifier) of a laser is proportional to a distance. The signal processing module may acquire the voltage at the output end of the laser or the output voltage of the transconductance amplifier in each half period, perform a fast Fourier transform to obtain the SMI frequency, and calculate, based on the SMI frequency, the distance b between the laser emission spot of the first laser $L_{a1}$ and the laser reflection spot in the reference plane and the distance a between the laser emission spot of the first laser $L_{a2}$ and the laser reflection spot in the reference plane. For specific implementation, refer to a principal process of laser ranging in the conventional technology, and details are not described herein again.

Therefore, the distance $L_{AB}$ between the reflection point A and the reflection point B in the reference plane may be obtained according to Formula 1 to Formula 3.

In the triangle $O_1AB$, three side lengths of the triangle $O_1AB$ and one of the included angles are known, and another included angle may be obtained according to trigonometric functions. For example, an included angle β between an optical axis of the first laser beam emitted by the first laser $L_{a1}$ and the reference plane may be expressed by using a formula:

$$\beta = \sin^{-1}(L_{O_1A}\sin\alpha/L_{AB})  \qquad \text{Formula 4}$$

Figure 7:
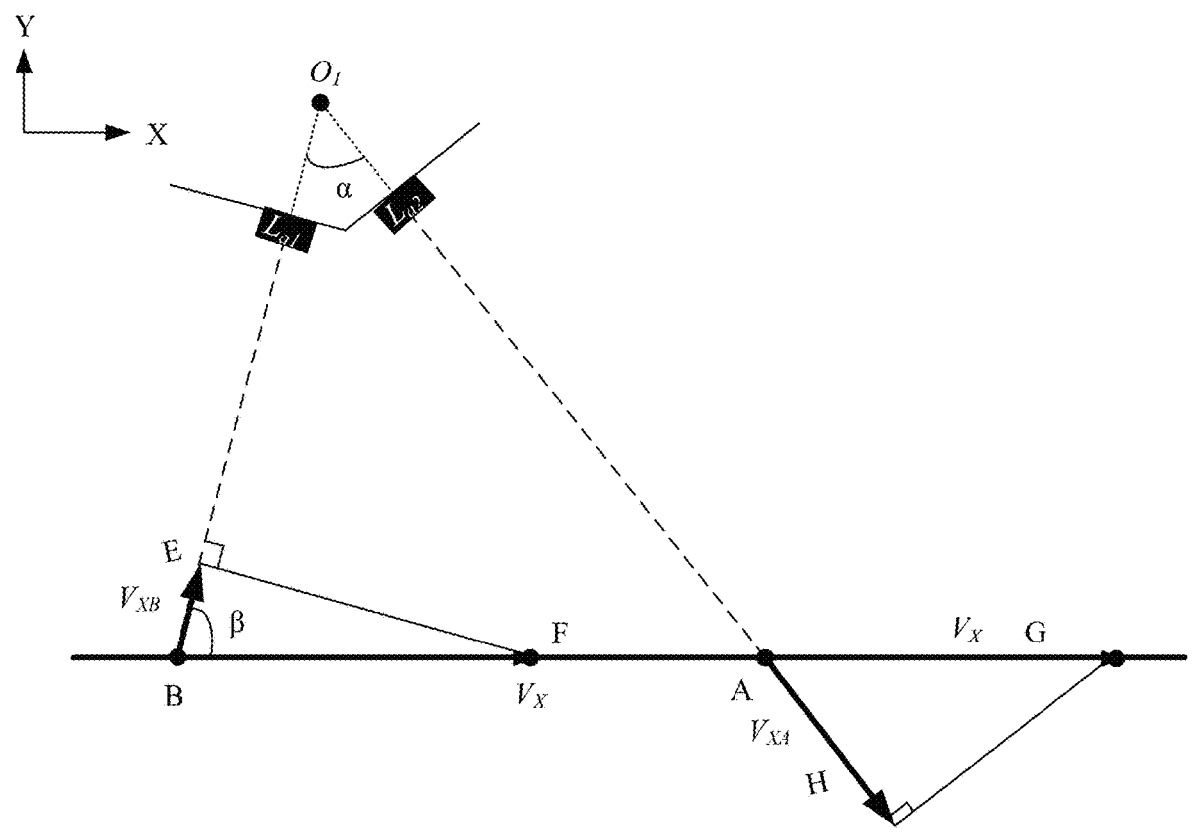
FIG. 7 is a schematic diagram of speed decomposition of an input detection apparatus in an x-axis direction in a reference plane according to an embodiment.

FIG. 7 is a schematic diagram of speed decomposition of an input detection apparatus in an x-axis direction in a reference plane according to an embodiment. As shown in FIG. 7, a speed of the input detection apparatus relative to the reference plane in an optical axis direction of the first laser beam emitted by the first laser $L_{a1}$ is denoted as $V_{XB}$. The speed $V_{XB}$ of the input detection apparatus relative to the reference plane in the optical axis direction of the laser light emitted by the first laser $L_{a1}$ in the x-axis direction in the reference plane is decomposed, to construct a triangle EBF. In the triangle EBF, a speed (in other words, a first speed $V_X$ in the reference plane) of the input detection apparatus in the x-axis direction in the reference plane may be obtained as follows:

$$V_X = V_{XB}/\cos\beta \qquad \text{Formula 5}$$

β may be obtained according to Formula 4, and $V_{XB}$ is a value obtained through measurement by the input detection apparatus. During specific implementation, for measurement of $V_{XB}$, refer to laser speed measurement using a Doppler frequency shift mechanism in the conventional technology. The processor (for example, the signal processor module) may determine, based on the voltage at the output end of the first laser $L_{a1}$ or the output voltage of the transconductance amplifier that is read by the voltage reading module, a direction and an amplitude of the speed $V_{XB}$ of the input detection apparatus relative to the reference plane in the optical axis direction of the laser light emitted by the first laser $L_{a1}$. It should be noted that speed representations in this application have directions. Similarly, the signal processing module may also be represented as $V_{XA}$ based on a speed of the input detection apparatus relative to the reference plane in the optical axis direction of the laser light emitted by the first laser $L_{a2}$. Based on the voltage at the output end of the first laser $L_{a2}$ or the output voltage of the transconductance amplifier that is read by the voltage reading module, a direction and an amplitude of the speed $V_{XA}$ of the input detection apparatus relative to the reference plane in the optical axis direction of the laser light emitted by the first laser $L_{a2}$ are determined. It may be understood that, when the input detection apparatus moves relative to the reference plane, a Doppler frequency shift is superimposed on an SMI frequency of a self-mixing interference signal (for example, a voltage at an output end of a laser or an output voltage of a transconductance amplifier) of a laser, and the signal processing module may obtain a direction and an amplitude of a speed of the input detection apparatus in an optical axis direction of a corresponding laser by comparing SMI frequencies in two adjacent periods. For specific implementation, refer to a principle process of laser speed measurement in the conventional technology, and details are not described herein again.

Optionally, in some feasible implementations, the processor (for example, the signal processing module) may calculate the first speed $V_X$ of the input detection apparatus in the reference plane by using the speed $V_{XA}$ of the input detection apparatus relative to the reference plane in an optical axis direction of the second laser beam emitted by the first laser $L_{a2}$. For example, the speed $V_{XA}$ of the input detection apparatus relative to the reference plane in the optical axis direction of the second laser beam emitted by the first laser $L_{a2}$ in the x-axis direction in the reference plane is decomposed, to construct a triangle HAG. In the triangle HAG, the first speed $V_X$ may be expressed as:

$$V_X = V_{XA}/[\cos(180° - \alpha - \beta)] \qquad \text{Formula 6}$$

α is a preset fixed known value. β may be obtained according to Formula 4. $V_{XA}$ may be a value obtained through measurement by the input detection apparatus.

It may be understood that the first speed $V_X$ of the input detection apparatus in the reference plane may be obtained by using either of Formula 5 and Formula 6.

The processor (for example, the signal processing module) may perform integration on a time by using the first speed $V_X$ of the input detection apparatus in the reference plane, to obtain that a first displacement $S_x$ of the input detection apparatus in the reference plane is:

$$S_x = \int_0^t V_X(t')dt' \qquad \text{Formula 7}$$

$V_X(t')$ represents a first speed of the input detection apparatus in the reference plane at a moment t', and the moment t' is any moment in a time period 0-t.

The signal processor module may further obtain an x-axis coordinate $X_0$ of the input detection apparatus at an initial moment. The initial moment herein may be understood as a moment 0 within a time 0-t.

An x-axis coordinate X(t) of the input detection apparatus at a $t^{th}$ moment may be represented as follows:

$$X(t) = \int_0^t V_X(t')dt' + X_0 \qquad \text{Formula 8}$$

In summary, the signal processing module in the processor may determine the first displacement of the input detection apparatus in the reference plane, and may determine the x-axis coordinate of the input detection apparatus at the $t^{th}$ moment.

Figure 8:
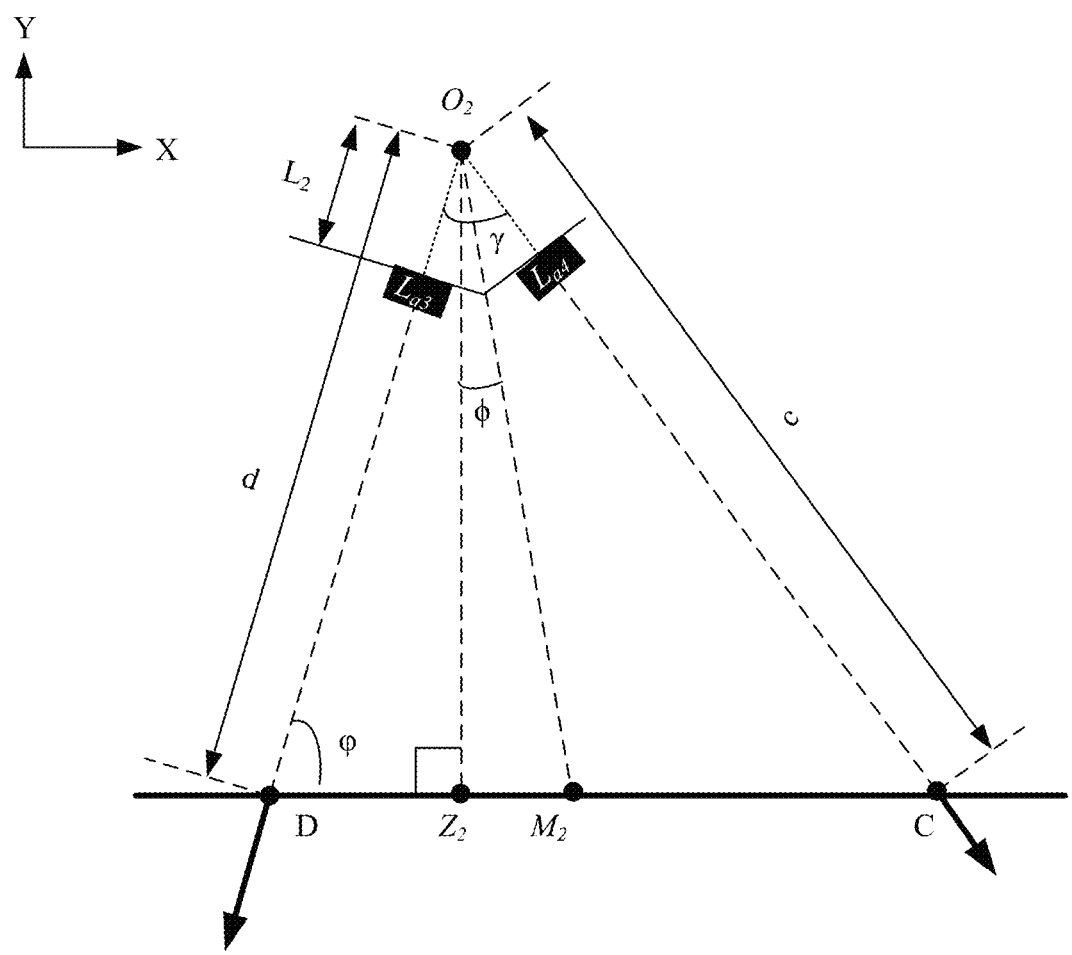
FIG. 8 is a schematic diagram of configuration of an input detection apparatus in a y-z plane according to an embodiment.

Further, in some feasible implementations, as shown by the three-dimensional schematic diagram of the input detection apparatus in FIG. 4, there are at least two laser beams between the input detection apparatus and the reference plane. To be specific, in addition to the first laser $L_{a1}$ and the first laser $L_{a2}$, the input detection apparatus further includes at least two second lasers disposed in a second axial direction (in other words, a y-axis direction). Positions of the at least two second lasers may be shown as a second laser $L_{a3}$ and a second laser $L_{a4}$ in FIG. 5. In this case, for a schematic diagram of configuration of the input detection apparatus in the y-z plane, refer to FIG. 8. As shown in FIG. 8, the second laser $L_{a3}$ emits a third laser beam to the reference plane. The third laser beam intersects the reference plane at a point D. The point D is a laser reflection spot of the third laser beam in the reference plane. Similarly, the second laser $L_{a4}$ emits a fourth laser beam to the reference plane. The second laser beam intersects the reference plane at a point C. The point C is a laser reflection spot of the fourth laser beam in the reference plane. A distance from a laser emission spot of the second laser $L_{a3}$ to the point D in the reference plane is denoted as d, and a distance from a laser emission spot of the first laser $L_{a4}$ to the point C in the reference plane is denoted as c.

An inverse extension line of the third laser beam emitted by the second laser $L_{a3}$ to the reference plane intersects with an inverse extension line of the fourth laser beam emitted by the second laser $L_{a4}$ at a virtual point $O_2$. A distance from the virtual point $O_2$ to the point D in the reference plane is denoted as $L_{O_2D}$, a distance from the virtual point O to the point C in the reference plane is denoted as $L_{O_{2c}}$, and a distance from the virtual point $O_2$ to the second laser $L_{a4}$ or from the virtual point $O_2$ to the second laser $L_{a3}$ is denoted as $L_2$.

In a triangle $O_2CD$, according to trigonometric functions, it may be obtained that a distance $L_{CD}$ between the reflection point C and the reflection point D in the reference plane is:

$$L_{CD} = \sqrt{L_{O_2C}^2 + L_{O_2D}^2 - 2L_{O_2C}L_{O_2D}\cos\gamma} \qquad \text{Formula 9}$$

$\gamma$ is an included angle between the inverse extension line of the third laser beam emitted by the second laser $L_{a3}$ to the reference plane and the inverse extension line of the fourth laser beam emitted by the second laser $L_{a4}$. $\gamma$ is a preset fixed known value, and is determined by a relative position between the second laser $L_{a3}$ and the second laser $L_{a4}$.

The distance $L_{O_{2c}}$ between the virtual point $O_2$ and the point C in the reference plane may be calculated by using the following formula:

$$L_{O_2C} = c + L_2 \qquad \text{Formula 10}$$

The distance $L_{O_2D}$ between the virtual point $O_2$ and the point D in the reference plane may be calculated by using the following formula:

$$L_{O_2D} = d + L_2 \qquad \text{Formula 11}$$

During specific implementation, the second laser $L_{a3}$ and the second laser $L_{a4}$ are separately disposed on substrates. There is a third included angle between the substrate on which the second laser $L_{a3}$ is located and the substrate on which the second laser $L_{a4}$ is located. There is a fourth included angle (that is, an angle $\gamma$) between the third laser beam emitted by the second laser $L_{a3}$ and the fourth laser beam emitted by the second laser $L_{a4}$, and a sum of the third included angle and the angle $\gamma$ is 180°. In other words, the angle $\gamma$ is correspondingly fixed after the included angle between the substrate on which the second laser $L_{a3}$ is located and the substrate on which the second laser $L_{a4}$ is located is fixed. Optionally, a range of the angle $\gamma$ may be 20° to 45°, and an included angle range of the third included angle may be 1350 to 160°.

Further, the distance between the second laser $L_{a3}$ and the second laser $L_{a4}$ and $\gamma$ jointly determine a distance $L_2$ between the virtual point $O_2$ and each laser (for example, the second laser $L_{a3}$ or the second laser $L_{a4}$). In other words, $L_2$ is correspondingly fixed after the included angle and the distance between the second laser $L_{a3}$ and the second laser $L_{a4}$ are fixed. To be specific, $L_2$ is a preset fixed known value.

Similarly, the distance $L_{O_2c}$ between the laser emission spot of the second laser $L_{a4}$ and the point C in the reference plane and the distance $L_{O_2D}$ between the laser emission spot of the second laser $L_{a3}$ and the point D in the reference plane are values obtained through measurement by the input detection apparatus.

Therefore, the distance $L_{CD}$ between the reflection point C and the reflection point D in the reference plane may be obtained according to Formula 9 to Formula 11.

In the triangle $O_2CD$, three side lengths of the triangle $O_2CD$ and one of the included angles are known, and another included angle may be obtained according to trigonometric functions. For example, an included angle $\varphi$ between an optical axis of the third laser beam emitted by the second laser $L_{a3}$ and the reference plane may be expressed by using a formula:

$$\varphi = \sin^{-1}(L_{O_2C}\sin\alpha/L_{CD}) \qquad \text{Formula 12}$$

Figure 9:
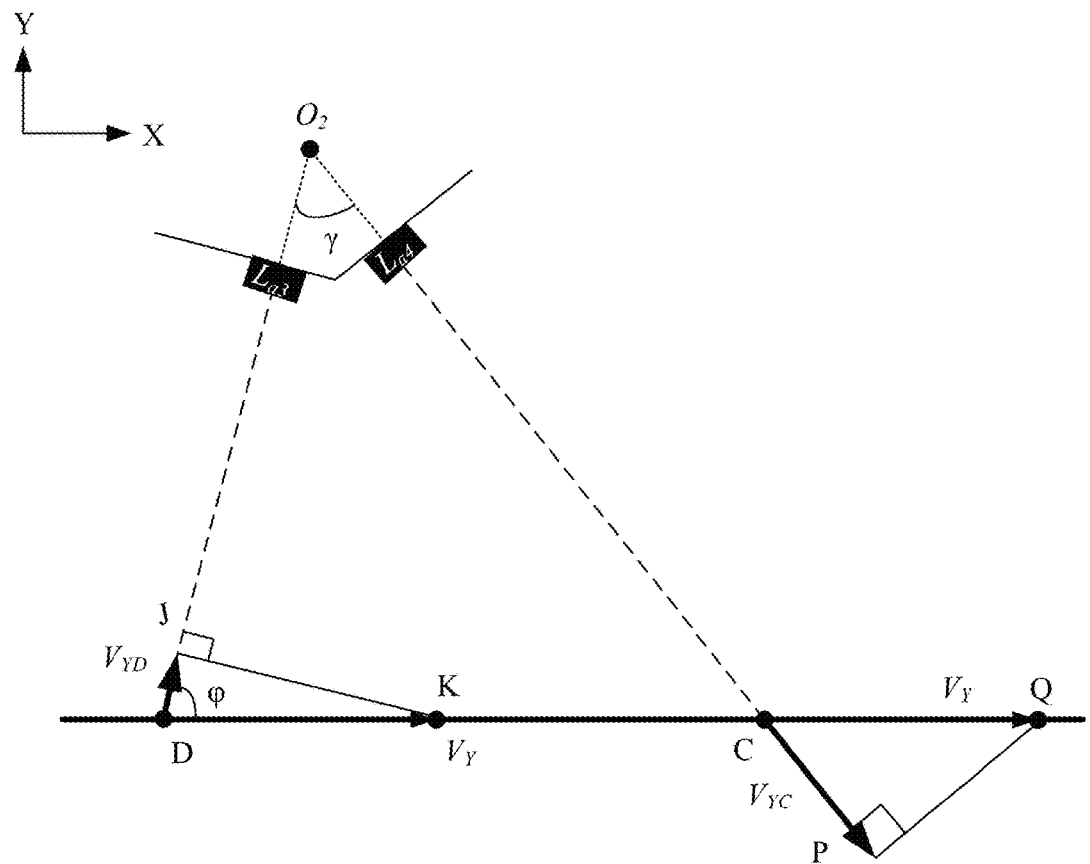
FIG. 9 is a schematic diagram of speed decomposition of an input detection apparatus in a y-axis direction in a reference plane according to an embodiment.
Figure 10:
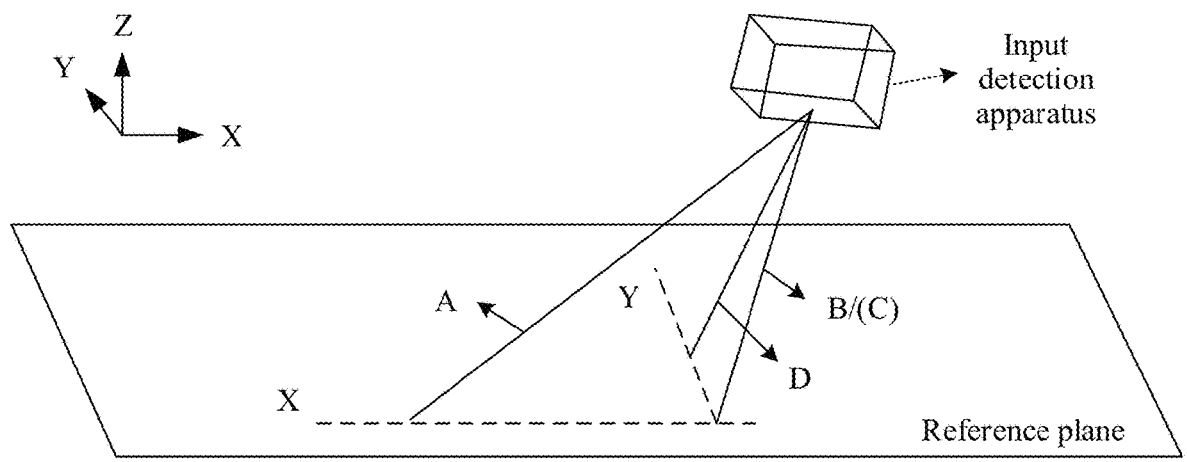
FIG. 10 is another three-dimensional schematic diagram of an input detection apparatus according to an embodiment.

FIG. 9 is a schematic diagram of speed decomposition of an input detection apparatus in a y-axis direction in a reference plane according to an embodiment. As shown in FIG. 9, a speed of the input detection apparatus relative to the reference plane in an optical axis direction of the third laser beam emitted by the second laser $L_{a3}$ is denoted as $V_{YD}$. The speed $V_{YD}$ of the input detection apparatus relative to the reference plane in the optical axis direction of the laser light emitted by the second laser $L_{a3}$ in the y-axis direction in the reference plane is decomposed, to construct a triangle JDK. In the triangle JDK, a speed (in other words, a second speed $V_X$ in the reference plane) of the input detection apparatus in the y-axis direction in the reference plane may be obtained as follows:

$$V_Y = V_{YD}/\cos\varphi \qquad \text{Formula 13}$$

$\varphi$ may be obtained according to Formula 12, and $V_{YD}$ is a value obtained through measurement by the input detection apparatus.

Optionally, in some feasible implementations, the processor (for example, the signal processing module) may calculate the second speed $V_Y$ of the input detection apparatus in the reference plane by using the speed $V_{YC}$ of the input detection apparatus relative to the reference plane in an optical axis direction of the fourth laser beam emitted by the second laser $L_{a4}$. For example, the speed $V_{YC}$ of the input detection apparatus relative to the reference plane in the optical axis direction of the fourth laser beam emitted by the second laser $L_{a4}$ in the y-axis direction in the reference plane is decomposed, to construct a triangle PCQ. In the triangle PCQ, the second speed $V_Y$ may be expressed as:

$$V_Y = V_{YC}/[\cos(180° - \varphi - \gamma)] \quad \text{Formula 14}$$

$\gamma$ is a preset fixed known value. $\varphi$ may be obtained according to Formula 12. $V_{YC}$ may be a value obtained through measurement by the input detection apparatus.

It may be understood that the second speed $V_Y$ of the input detection apparatus in the reference plane may be obtained by using either of Formula 13 and Formula 14.

The processor (for example, the signal processing module) may perform integration on a time by using the second speed $V_Y$ of the input detection apparatus in the reference plane, to obtain that a second displacement $S_y$ of the input detection apparatus in the reference plane is:

$$S_y = \int_0^t V_Y(t')dt' \quad \text{Formula 15}$$

$V_Y(t')$ represents a second speed of the input detection apparatus in the reference plane at a moment t', and the moment t' is any moment in a time period 0-t.

The signal processor module may further obtain an y-axis coordinate $Y_0$ of the input detection apparatus at an initial moment. The initial moment herein may be understood as a moment 0 within the time period 0-t.

A y-axis coordinate $Y(t)$ of the input detection apparatus at a $t^{th}$ moment may be represented as follows:

$$Y(t) = \int_0^t V_Y(t')dt' + Y_0 \quad \text{Formula 16}$$

In summary, the signal processing module in the processor may determine the second displacement of the input detection apparatus in the reference plane, and may determine the y-axis coordinate of the input detection apparatus at the $t^{th}$ moment.

In an embodiment, the first displacement and the second displacement of the input detection apparatus are measured by using the self-mixing interference signals of the lasers. The processor may determine a movement path of the input detection apparatus based on the first displacement and the second displacement, so that a mouse control function can be implemented, and experience similar to that of natural writing or drawing by a user holding a pen can be achieved. To be specific, the input detection apparatus may integrate a mouse and a stylus, and may directly write on any plane, for example, a desktop, a paper, or a screen, it is not necessary to equip an electromagnetic panel like an existing electromagnetic touch panel, which has good applicability, and the device is light and convenient to carry.

Optionally, the wireless communication module in the input detection apparatus may send the x-axis coordinate $X(t)$ and the y-axis coordinate $Y(t)$ of the input detection apparatus at the $t^{th}$ moment to an electronic device. The electronic device uses the x-axis coordinate $X(t)$ and the y-axis coordinate $Y(t)$ of the input detection apparatus at the $t^{th}$ moment as a first response parameter to perform an input response, for example, display a cursor in a two-dimensional plane.

Optionally, the wireless communication module in the input detection apparatus may send the first displacement $S_x$ and the second displacement $S_y$ of the input detection apparatus in the reference plane to the electronic device. The electronic device may generate the first response parameter based on the first displacement $S_x$ and the second displacement $S_y$. For example, the electronic device is a display device, and the display device stores an initial x-axis coordinate $X_0$ and an initial y-axis coordinate $Y_0$ of the input detection apparatus. In this case, the display device may generate a cursor display parameter on an x-axis based on the first displacement $S_x$ and the initial x-axis coordinate $X_0$, and generate a cursor display parameter of the cursor on the y-axis based on the second displacement $S_y$ and the initial y-axis coordinate $Y_0$.

Optionally, in some feasible implementations, there are four laser beams between the input detection apparatus shown in FIG. 4 and the reference plane. In an embodiment, as shown in the three-dimensional schematic diagram shown in FIG. 10, only three laser beams are required to implement the embodiments described above with reference to FIG. 4 to FIG. 9. During specific implementation, the x-z plane and the y-z plane share one laser. To be specific, only three lasers are required in an embodiment. Positions of the three lasers may be shown as a first laser $L_{a5}$, a second laser $L_{a6}$, and a third laser $L_{a7}$ in FIG. 11. It can be seen that the second laser $L_{a6}$ is disposed at an intersection point between the first axial direction (x-axis) and the second axial direction (y-axis). A specific implementation principle of the three lasers shown in an embodiment is the same as that of the four lasers described above, except that in an embodiment, one of the lasers is placed at an intersection of the x-axis and the y-axis, so that the x-z plane and the y-z plane can share the second laser $L_{a6}$. Different from the four lasers described above, the first displacement and the second displacement of the input detection apparatus in the reference plane are determined in a staggered manner. For example, the second laser $L_{a6}$ and the first laser $L_{a5}$ are first used to measure the first displacement of the input detection apparatus in the reference plane, and then the second laser $L_{a6}$ and the third laser $L_{a7}$ are used to measure the second displacement of the input detection apparatus in the reference plane. A measurement time interval between the first displacement and the second displacement is short, and may be considered as being used to jointly determine a movement path of the input detection apparatus in the reference plane. Implementation of an embodiment has low costs.

It may be understood that the lasers shown with reference to FIG. 4 to FIG. 11 are all disposed on substrates, and one laser emits one laser beam. Optionally, in some feasible implementations, one laser has two light holes, and may emit two laser beams. FIG. 12 is a schematic diagram of a structure of a laser according to an embodiment. As shown in FIG. 12, an example in which the first laser $L_{a1}$ and the first laser $L_{a2}$ are integrated into one laser is used. A convex lens is disposed on a surface of the laser. The convex lens may emit, at a specific angle, laser light emitted by the first laser $L_{a1}$ and the laser light emitted by the first laser $L_{a2}$. Certainly, the convex lens may also receive returning laser light based on an emission direction of laser light.

Figure 13:
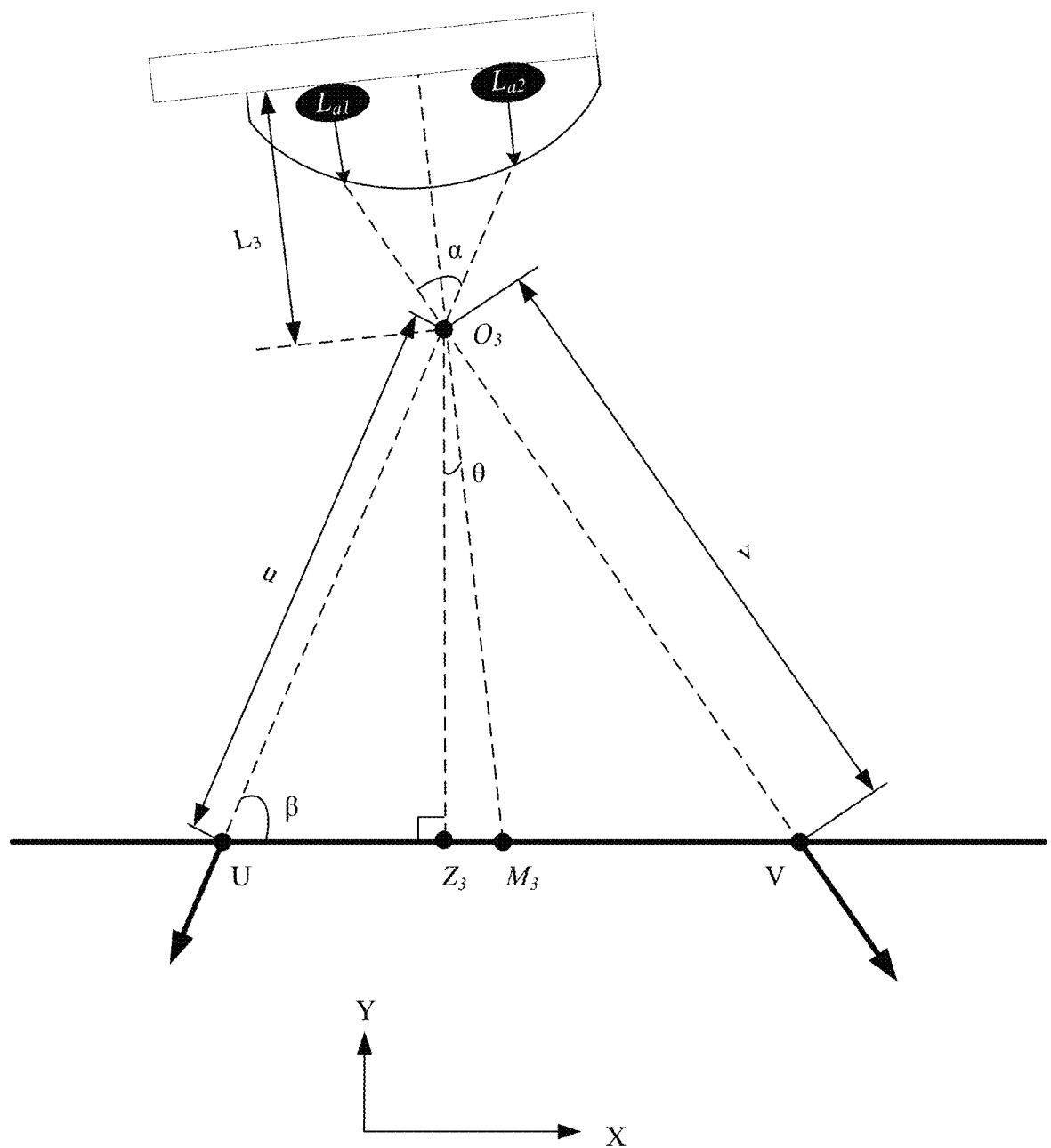
FIG. 13 is another schematic diagram of configuration of an input detection apparatus in an x-z plane according to an embodiment.

For a schematic diagram of configuration of the input detection apparatus in the x-z plane, refer to FIG. 13. As shown in FIG. 13, the first laser $L_{a1}$ emits a fifth laser beam to the reference plane. The fifth laser beam intersects the reference plane at a point V. The point V is a laser reflection spot of the fifth laser beam in the reference plane. Similarly, the first laser $L_{a2}$ emits a sixth laser beam to the reference plane. The sixth laser beam intersects the reference plane at a point U. The point U is a laser reflection spot of the sixth laser beam in the reference plane.

The fifth laser beam emitted by the first laser $L_{a1}$ to the reference plane intersects with the sixth laser beam emitted by the first laser $L_{a2}$ at a point $O_3$. A distance between the point $O_3$ and the point V in the reference plane is denoted as v, and a distance between the point $O_3$ and the point U in the reference plane is denoted as u. In addition, an equivalent optical path from a laser emission spot of the first laser $L_{a1}$ to the point $O_3$ is represented as $L_3$, and an equivalent optical path from the first laser $L_{a2}$ to the point $O_3$ is also $L_3$.

In a triangle $O_3UV$, according to trigonometric functions, it may be obtained that a distance Luv between the reflection point U and the reflection point V in the reference plane is:

$$L_{UV} = \sqrt{v^2 + u^2 - 2uv\cos\alpha} \qquad \text{Formula 17}$$

In this case, $\alpha$ is an included angle between the fifth laser beam emitted by the first laser $L_{a1}$ to the reference plane and the sixth laser beam emitted by the first laser $L_{a2}$. $\alpha$ is a preset fixed known value, and is determined by a relative position between the first laser $L_{a1}$ and the first laser $L_{a2}$.

The input detection apparatus may measure a distance (in other words, $v+L_3$) between the laser emission spot of the first laser $L_{a1}$ and the point V in the reference plane and a distance (in other words, $u+L_3$) between a laser emission spot of the first laser $L_{a2}$ and the point U in the reference plane. $L_3$ is a preset fixed value, and is determined by the relative position between the first laser $L_{a1}$ and the first laser $L_{a2}$, and may be understood as a device attribute of the lasers. Optionally, in some feasible implementations, $L_3$ may be ignored, to be specific, $L_3$ is zero.

In the triangle $O_3UV$, three side lengths of the triangle $O_3UV$ and one of the included angles are known, and another included angle may be obtained according to trigonometric functions. For example, an included angle $\beta$ between an optical axis of the fifth laser beam emitted by the first laser $L_{a1}$ and the reference plane may be expressed by using a formula:

$$\beta = \sin^{-1}(v\sin\alpha/L_{UV}) \qquad \text{Formula 18}$$

Figure 14:
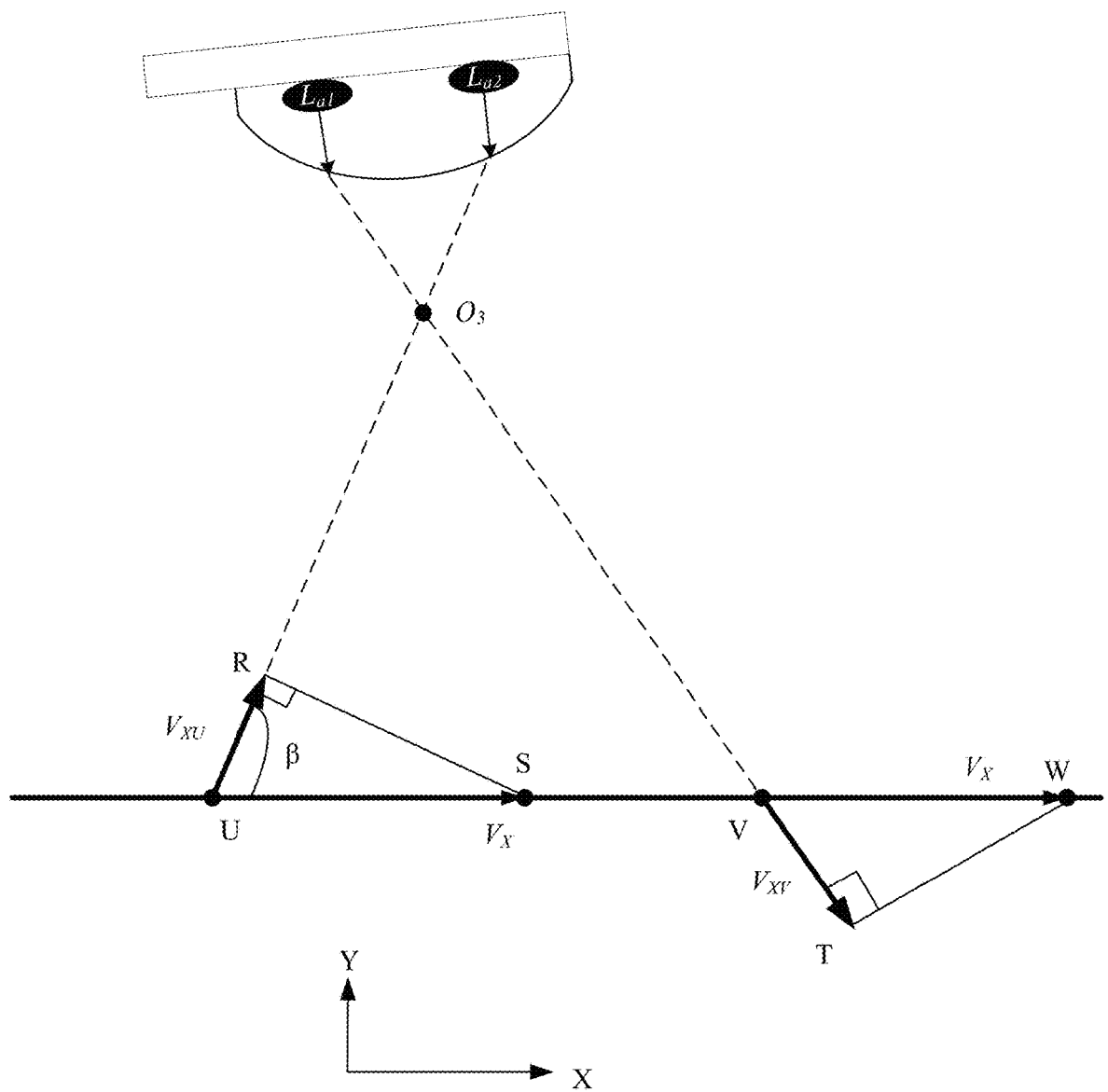
FIG. 14 is another schematic diagram of speed decomposition of an input detection apparatus in an x-axis direction in a reference plane according to an embodiment.

FIG. 14 is another schematic diagram of speed decomposition of an input detection apparatus in an x-axis direction in a reference plane according to an embodiment. As shown in FIG. 14, a speed of the input detection apparatus relative to the reference plane in an optical axis direction of the sixth laser beam emitted by the first laser $L_{a2}$ is denoted as $V_{XU}$. The speed $V_{XU}$ of the input detection apparatus relative to the reference plane in the optical axis direction of the laser light emitted by the first laser $L_{a2}$ in the x-axis direction in the reference plane is decomposed, to construct a triangle RUS. In the triangle RUS, a speed (in other words, a first speed $V_X$ in the reference plane) of the input detection apparatus in the x-axis direction in the reference plane may be obtained as follows:

$$V_X = V_{XU}/\cos\beta \qquad \text{Formula 19}$$

$\beta$ may be obtained according to Formula 18, and $V_{XU}$ is a value obtained through measurement by the input detection apparatus.

Similarly, a triangle TVW may be constructed on a speed relative to the reference plane in the optical axis direction of the fifth laser beam emitted by the first laser $L_{a1}$, to obtain through decomposition that the first speed $V_X$ of the input detection apparatus in the reference plane is:

$$V_X = V_{XV}/[\cos(180° - \alpha - \beta)] \qquad \text{Formula 20}$$

Figure 11:
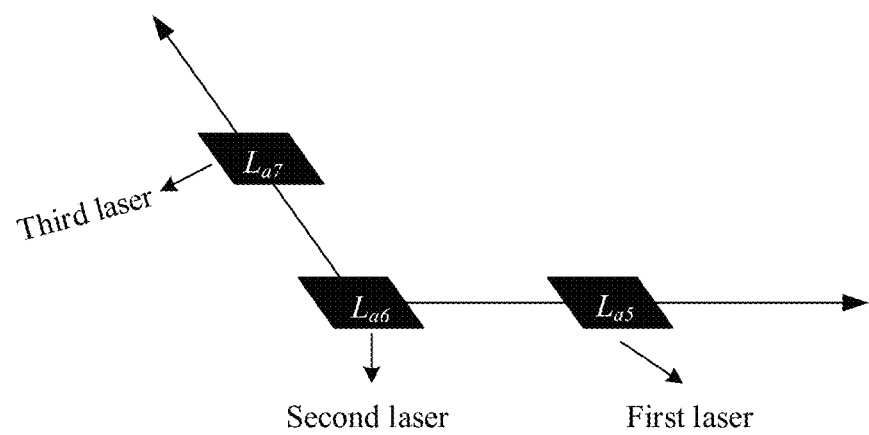
FIG. 11 is another schematic diagram of placement of a laser according to an embodiment.
Figure 12:
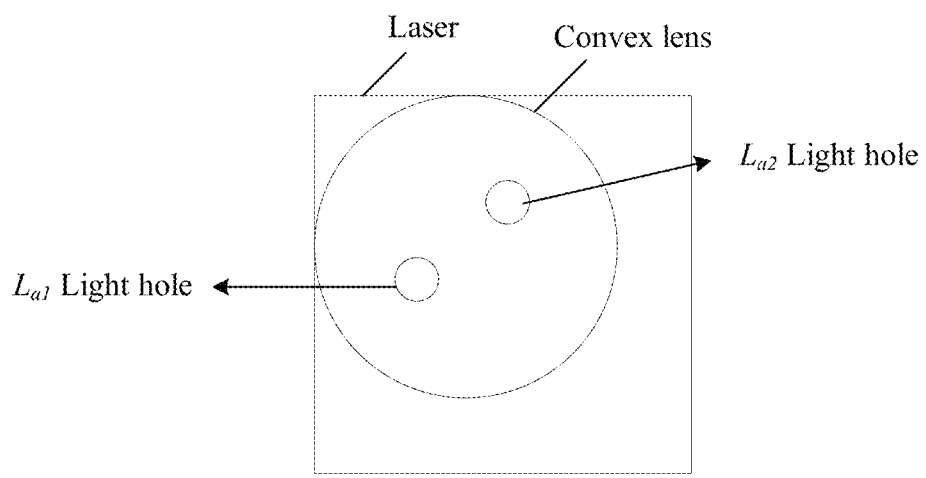
FIG. 12 is a schematic diagram of a structure of a laser according to an embodiment.

It may be understood that, in FIG. 11 and FIG. 12, an example in which the light hole of the first laser $L_{a1}$ and the light hole of the first laser $L_{a2}$ are integrated into one laser is used, and a second laser $L_{a3}$ and a second laser $L_{a4}$ may also be integrated into a same laser. For a specific implementation process, refer to descriptions of implementation of the first laser $L_{a1}$ and the first laser $L_{a2}$. Details are not described herein again.

This embodiment provides another specific form of a laser. Light holes of two lasers are integrated into a same laser, and two laser beams are emitted through a convex lens. This has high integration, and can reduce an area of the input detection apparatus.

In some feasible implementations, the processor (for example, the signal processing module) in an embodiment may determine tilt information of the input detection apparatus. The signal processing module measures the tilt information of the input detection apparatus by determining an included angle.

For example, the signal processing module uses the angle $\theta$ shown in FIG. 6 to measure first tilt information of the input detection apparatus relative to the first plane (in other words, the x-z plane). The angle $\theta$ is an included angle between an angular bisector $O_1M$ of the included angle $\alpha$ and a vertical line $O_1Z$ in the reference plane from the virtual point $O_1$.

In the triangle $O_1AB$ shown in FIG. 6, the angle $\theta$ may be expressed as:

$$\theta = \begin{cases} \alpha/2 - (90° - \beta) \\ \alpha/2 + (90° - \beta) \end{cases} \qquad \text{Formula 21}$$

$\alpha$ is an included angle between the inverse extension line of the first laser beam emitted by the first laser $L_{a1}$ to the reference plane and the inverse extension line of the second laser beam emitted by the first laser $L_{a2}$. $\alpha$ is a preset fixed known value, and is determined by a relative position between the first laser $L_{a1}$ and the first laser $L_{a2}$. In addition, s may be obtained according to Formula 4. Therefore, the signal processing module may determine the first tilt information of the input detection apparatus in the x-z plane with reference to Formula 1 to Formula 4 and Formula 21.

The input detection apparatus in an embodiment has a tilt angle recognition function. To be specific, the input detection apparatus may recognize a tilt angle of the input detection apparatus in the first plane. For example, the input detection apparatus is specifically implemented as a mouse pen, and the mouse pen may recognize a tilt angle of a pen head in the first plane, to implement writing brush/painting brush-level stroking and writing experience, or adjust a concentration of ink strokes during writing or drawing through different tilt angle s. A specific display effect may be adjusted based on user requirement. This is not limited herein.

Optionally, the wireless communication module in the input detection apparatus may send the first tilt information of the input detection apparatus in the x-z plane to the electronic device, the electronic device generates a second response parameter, for example, a concentration of ink strokes, based on the first tilt information, and the electronic device displays the second response parameter. Alternatively, the wireless communication module in the input detection apparatus may send the first displacement and the second displacement of the input detection apparatus in the reference plane and the first tilt information of the input detection apparatus in the x-z plane to the electronic device, the electronic device generates a second response parameter, for example, a concentration of ink strokes, based on the first tilt information, and the electronic device displays the second response parameter.

Optionally, the signal processing module generates the second response parameter, for example, the concentration of ink strokes, based on the first tilt information in the x-z plane. The wireless communication module in the input detection apparatus may send the second response parameter to the electronic device, and the electronic device may directly make a response, for example, change the concentration of ink strokes, based on the second response parameter. Alternatively, the signal processing module generates the second response parameter, for example, the concentration of ink strokes, based on the first displacement and the second displacement of the input detection apparatus in the reference plane and the first tilt information of the input detection apparatus in the x-z plane. The wireless communication module in the input detection apparatus may send the second response parameter to the electronic device, and the electronic device may directly make a response, for example, change the concentration of ink strokes, based on the second response parameter.

Optionally, in some feasible implementations, the signal processing module uses the angle $\theta$ shown in FIG. 8 to measure the second tilt information of the input detection apparatus in the second plane (in other words, the y-z plane). The angle $\emptyset$ is an included angle between an angular bisector $O_2M_2$ of the included angle $\gamma$ and a vertical line $O_2Z_2$ in the reference plane from the virtual point $O_2$.

In the triangle $O_2CD$ shown in FIG. 8, the angle $\emptyset$ may be expressed as:

$$\emptyset = \begin{cases} \gamma/2 - (90° - \varphi) \\ \gamma/2 + (90° - \varphi) \end{cases} \qquad \text{Formula 22}$$

$\gamma$ is an included angle between the inverse extension line of the third laser beam emitted by the second laser $L_{a3}$ to the reference plane and the inverse extension line of the fourth laser beam emitted by the second laser $L_{a4}$. $\gamma$ is a preset fixed known value, and is determined by a relative position between the second laser $L_{a3}$ and the second laser $L_{a4}$. In addition, $\varphi$ may be obtained according to Formula 12. Therefore, the signal processing module may determine the second tilt information of the input detection apparatus in the y-z plane with reference to Formula 9 to Formula 12 and Formula 22.

Optionally, the signal processing module may determine the tilt angle of the input detection apparatus based on at least one of the first tilt information and the second tilt information.

In some feasible implementations, the processor (for example, the signal processing module) in an embodiment may determine a distance between the input detection apparatus and the reference plane.

In some feasible implementations, the distance between the input detection apparatus and the reference plane is a length of the line segment $O_1Z_1$ shown in FIG. 6, and may be represented as follows:

$$L_{O_1Z_1} = L_{O_1B}\sin\beta \qquad \text{Formula 23}$$

B may be obtained according to Formula 3, and 3 may be obtained according to Formula 4. Therefore, the signal processing module may determine a distance Z between the input detection apparatus and the reference plane with reference to Formula 1 to Formula 4 and Formula 23.

Optionally, a distance $L_{O_2Z_2}$ between the input detection apparatus and the reference plane may be determined with reference to FIG. 8, and may be specifically expressed as follows:

$$L_{O_2Z_2} = L_{O_2D}\sin\varphi \qquad \text{Formula 24}$$

D may be obtained according to Formula 11, and $\varphi$ may be obtained according to Formula 12. Therefore, the signal processing module may similarly determine a distance Z between the input detection apparatus and the reference plane with reference to Formula 9 to Formula 12 and Formula 24.

The input detection apparatus in an embodiment may determine a displacement of the input detection apparatus in a Z-axis direction. For example, the input detection apparatus is a mouse pen. A pen-up state and a pen-down state of the mouse pen may be identified through a displacement in the Z-axis direction. Unlike a mouse, a pen-up and a pen-down of the mouse pen do not need to be distinguished through a key, and handwriting or drawing may be performed without holding down a left button area. This embodiment can achieve experience similar to that of natural writing or drawing by a user holding a pen.

Optionally, the wireless communication module in the input detection apparatus may send the distance Z between the input detection apparatus and the reference plane to the electronic device. The electronic device may generate a third response parameter when the distance Z between the input detection apparatus and the reference plane is greater than a preset threshold. For example, the input detection apparatus is a mouse pen. In this case, the mouse pen is in a pen-up state, and the electronic device may generate the third response parameter, for example, display a prompt indicating that the pen is lifted, or drive a speaker to operate. The input detection apparatus generates a fourth response parameter is generated when the distance Z between the input detection apparatus and the reference plane is less than the preset threshold. For example, the input detection apparatus is a mouse pen. In this case, the mouse pen is in a pen-down state, and the electronic device may generate the fourth response parameter, for example, display a tip.

Optionally, the signal processing module in the processor may generate a third response parameter when the distance between the input detection apparatus and the reference plane is greater than a preset threshold, or generate a fourth response parameter when the distance between the input detection apparatus and the reference plane is not greater than a preset threshold. The input detection apparatus further includes a wireless communication module, and the wireless communication module is coupled to the processor. The wireless communication module may establish a connection to the electronic device, and send the third response parameter or the fourth response parameter to the electronic device. The third response parameter or the fourth response parameter may indicate the electronic device to perform an input response, for example, display a prompt indicating that a pen is lifted or display a tip.

It needs to be noted that the terms "first" and "second" are used only for purpose of description, but are not intended to indicate or imply relative importance.

The foregoing descriptions are merely specific implementations of disclosed embodiments but are not intended to limit the protection scope of this disclosure. Any variation or replacement readily figured out by a person skilled in the art within the technical scope disclosed in the foregoing detailed description shall fall within the protection scope of the accompanying claims.

What is claimed is:

1. An input detection apparatus, comprising:
a plurality of lasers; and
a processor, the lasers comprising at least two first lasers disposed in a first axial direction and at least two second lasers disposed in a second axial direction, the first axial direction being perpendicular to the second axial direction, each of the first lasers and each of the second lasers being coupled to the processor;
the laser being configured to emit laser light and to generate a self-mixing interference signal when the laser light is reflected into a resonant cavity of the laser through a reference plane, wherein the processor is configured to:
determine a first displacement of the input detection apparatus in the reference plane based on self-mixing interference signals generated by all the first lasers and relative position information between the at least two first lasers, and determine a second displacement of the input detection apparatus in the reference plane based on self-mixing interference signals generated by all the second lasers and relative position information between the at least two second lasers; and
determine a movement path of the input detection apparatus in the reference plane based on the first displacement and the second displacement of the input detection apparatus in the reference plane.

2. The input detection apparatus according to claim 1, wherein the determination by the processor of a first displacement of the input detection apparatus in the reference plane based on self-mixing interference signals generated by all the first lasers and relative position information between the at least two first lasers comprises:
determining distances between each of the laser emission spots of all the first lasers and each of the laser reflection spots of the reference plane based on the self-mixing interference signals generated by all the first lasers, and determine, based on the distances between the laser emission spots of all the first lasers and the laser reflection spots of the reference plane and the relative position information between the at least two first lasers, an included angle between an optical axis of laser light emitted by any first laser and the reference plane;

determining, based on a self-mixing interference signal generated by any of the first lasers, a speed of the input detection apparatus relative to the reference plane in a direction of the optical axis of the laser light emitted by the any first laser; and
determining a first displacement speed of the input detection apparatus in the reference plane based on the included angle between the optical axis of the laser light emitted by any of the first lasers and the reference plane and the speed of the input detection apparatus relative to the reference plane in the direction of the optical axis of the laser light emitted by the any first laser; and
determining the first displacement of the input detection apparatus in the reference plane based on the first displacement speed.

3. The input detection apparatus according to claim 1, wherein the processor is further configured to determine first tilt information of the input detection apparatus relative to a first plane based on the self-mixing interference signals generated by all the first lasers and the relative position information between the at least two first lasers, wherein the first plane is perpendicular to the reference plane and passes through a straight line parallel to the first axial direction; or
the processor is further configured to determine second tilt information of the input detection apparatus relative to a second plane based on the self-mixing interference signals generated by all the second lasers and the relative position information between the at least two second lasers, wherein the second plane is perpendicular to the reference plane and passes through a straight line parallel to the second axial direction.

4. The input detection apparatus according to claim 3, wherein processor determination of first tilt information of the input detection apparatus relative to a first plane comprises:
determining distances between each of the laser emission spots of all of the first lasers and each of the laser reflection spots of the reference plane based on the self-mixing interference signals generated by all the first lasers;
determining, based on the distances between each of the laser emission spots of all of the first lasers and each of the laser reflection spots of the reference plane and the relative position information between the at least two first lasers, the included angle between the optical axis of the laser light emitted by the any first laser and the reference plane; and
determining the first tilt information of the input detection apparatus relative to the first plane based on the included angle between the optical axis of the laser light emitted by any first laser and the reference plane and the relative position information between the at least two first lasers.

5. The input detection apparatus according to claim 1, wherein the processor is further configured to:
determine a distance between the input detection apparatus and the reference plane based on the self-mixing interference signals generated by all the first lasers and the relative position information between the at least two first lasers; or
determine a distance between the input detection apparatus and the reference plane based on the self-mixing interference signals generated by all the second lasers and a relative position between the at least two second lasers; and wherein determination of the distance between the input detection apparatus and the reference plane comprises:

determining the distances between each of laser emission spots of all of the first lasers and each of the laser reflection spots of the reference plane based on the self-mixing interference signals generated by all the first lasers;

determining, based on the distances between each of the laser emission spots of all the first lasers and each of the laser reflection spots of the reference plane and the relative position information between the at least two first lasers, the included angle between the optical axis of the laser light emitted by the any first laser and the reference plane; and determining the distance between the input detection apparatus and the reference plane based on a distance between a laser emission spot of any laser and the corresponding laser reflection spot of the reference plane and an included angle between an optical axis of laser light emitted by the any laser and the reference plane.

6. The input detection apparatus according to claim 1, further comprising a beam coupler corresponding to each laser, wherein:

each laser is coupled to the corresponding beam coupler, each beam coupler being configured to converge laser light emitted by the corresponding laser and then emit converged laser light and converge and feed back laser light obtained after being reflected by the reference plane to a resonant cavity of the laser corresponding to the beam coupler.

7. The input detection apparatus according to claim 1, further comprising a driver corresponding to each laser, wherein:

each driver is coupled to the corresponding laser and is configured to output a drive current to the corresponding laser to drive the corresponding laser to emit laser light.

8. The input detection apparatus according to claim 1, further comprising a photodetector and a transconductance amplifier corresponding to each laser, wherein:

an input end of the photodetector is coupled to the corresponding laser, and the photodetector is configured to obtain an optical power signal of the corresponding laser and to convert the optical power signal into a photocurrent;

an input end of each transconductance amplifier is coupled to an output end of each corresponding photodetector, the transconductance amplifier being configured to receive photocurrent outputted by the photodetector and to convert and amplify the photocurrent into a voltage signal; and an output end of each transconductance amplifier is coupled to the processor, the processor being configured to use the voltage signal outputted by each transconductance amplifier as a self-mixing interference signal generated by the laser corresponding to the transconductance amplifier.

9. The input detection apparatus according to claim 1, further comprising a wireless communication module coupled to the processor, the wireless communication module being configured to establish a connection to an electronic device and to send the first displacement and the second displacement of the input detection apparatus in the reference plane to the electronic device, wherein the electronic device to generate a first response parameter based on the first displacement and the second displacement.

10. The input detection apparatus according to claim 1, wherein:

the processor is further configured to generate a first response parameter based on the first displacement and the second displacement of the input detection apparatus in the reference plane;

the input detection apparatus further comprises a wireless communication module coupled to the processor, the wireless communication module being configured to establish a connection to an electronic device and to send the first response parameter to the electronic device, wherein electronic device performs an input response based on the first response parameter.

11. The input detection apparatus according to claim 3, further comprising a wireless communication module coupled to the processor, the wireless communication module being configured to perform at least one of the following:

establish a connection to an electronic device; and send the first displacement and the second displacement of the input detection apparatus in the reference plane; and the electronic device generates a second response parameter based on at least one of the first displacement, the second displacement, the first tilt information, or the second tilt information.

12. The input detection apparatus according to claim 3, wherein the processor is further configured to generate a second response parameter based on at least one of the first displacement and the second displacement of the input detection apparatus in the reference plane, the first tilt information of the input detection apparatus relative to the first plane, or the second tilt information of the input detection apparatus relative to the second plane;

the input detection apparatus further comprises a wireless communication module coupled to the processor, the wireless communication module being configured to: establish a connection to an electronic device and to send the second response parameter to the electronic device, wherein the electronic device performs an input response based on the second response parameter.

13. The input detection apparatus according to claim 5, further comprising a wireless communication module coupled to the processor, the wireless communication module being configured to:

establish a connection to an electronic device and to send the distance between the input detection apparatus and the reference plane to the electronic device, and when the distance between the input detection apparatus and the reference plane is greater than a preset threshold, instruct the electronic device to generate a third response parameter, or when the distance between the input detection apparatus and the reference plane is less than a preset threshold, instruct the electronic device to generate a fourth response parameter.

14. The input detection apparatus according to claim 5, wherein the processor is further configured to:

generate a third response parameter when the distance between the input detection apparatus and the reference plane is greater than a preset threshold, or generate a fourth response parameter when the distance between the input detection apparatus and the reference plane is less than a preset threshold;

the input detection apparatus further comprising a wireless communication module coupled to the processor, the wireless communication module being configured to establish a connection to an electronic device and to send one of the third response parameter or the fourth response parameter to the electronic device, wherein the third response parameter or the fourth response parameter instruct the electronic device to perform an input response.

15. An input device, comprising
a housing; and
an input detection apparatus;
wherein the housing is configured as a pen-shaped housing, the input detection apparatus is disposed at a tip portion of the pen-shaped housing, and a pen head of the pen-shaped housing is a stylus pen head; and
wherein the input detection apparatus comprises a plurality of lasers and a processor, the plurality of lasers comprising at least two first lasers disposed in a first axial direction and at least two second lasers disposed in a second axial direction, the first axial direction is perpendicular to the second axial direction, each of the first lasers and each of the second lasers being coupled to the processor;
each laser being configured to emit laser light and to generate a self-mixing interference signal when the laser light is reflected into a resonant cavity of the laser through a reference plane;
the processor being configured to: determine a first displacement of the input detection apparatus in the reference plane based on self-mixing interference signals generated by all the first lasers and relative position information between the at least two first lasers, and determine a second displacement of the input detection apparatus in the reference plane based on self-mixing interference signals generated by all the second lasers and relative position information between the at least two second lasers; and
determine a movement path of the input detection apparatus in the reference plane based on the first displacement and the second displacement of the input detection apparatus in the reference plane.

16. The input device according to claim 15, wherein the determination by the processor of a first displacement of the input detection apparatus in the reference plane based on self-mixing interference signals generated by all the first lasers and relative position information between the at least two first lasers comprises:
determining distances between each of the laser emission spots of all the first lasers and each of the laser reflection spots of the reference plane based on the self-mixing interference signals generated by all the first lasers, and determine, based on the distances between the laser emission spots of all the first lasers and the laser reflection spots of the reference plane and the relative position information between the at least two first lasers, an included angle between an optical axis of laser light emitted by any first laser and the reference plane;
determining, based on a self-mixing interference signal generated by any of the first lasers, a speed of the input detection apparatus relative to the reference plane in a direction of the optical axis of the laser light emitted by the any first laser; and
determining a first speed of the input detection apparatus in the reference plane based on the included angle between the optical axis of the laser light emitted by any of the first lasers and the reference plane and the speed of the input detection apparatus relative to the reference plane in the direction of the optical axis of the laser light emitted by the any first laser, and determine the first displacement of the input detection apparatus in the reference plane based on the first speed.

17. The input device according to claim 15, wherein the processor is further configured to:
determine first tilt information of the input detection apparatus relative to a first plane based on the self-mixing interference signals generated by all the first lasers and the relative position information between the at least two first lasers, wherein the first plane is perpendicular to the reference plane and passes through a straight line parallel to the first axial direction; or
determine second tilt information of the input detection apparatus relative to a second plane based on the self-mixing interference signals generated by all the second lasers and the relative position information between the at least two second lasers, wherein the second plane is perpendicular to the reference plane and passes through a straight line parallel to the second axial direction.

18. The input device according to claim 17, wherein processor determination of first tilt information of the input detection apparatus relative to a first plane comprises:
determining distances between each of the laser emission spots of all first lasers and each of the laser reflection spots of the reference plane based on the self-mixing interference signals generated by all the first lasers;
determining, based on the distances between the laser emission spots of all the first lasers and the laser reflection spots of the reference plane and the relative position information between the at least two first lasers, the included angle between the optical axis of the laser light emitted by the any first laser and the reference plane; and
determining the first tilt information of the input detection apparatus relative to the first plane based on the included angle between the optical axis of the laser light emitted by the any first laser and the reference plane and the relative position information between the at least two first lasers.

19. The input device according to claim 15, wherein the processor is further configured to:
determine a distance between the input detection apparatus and the reference plane based on the self-mixing interference signals generated by all the first lasers and the relative position information between the at least two first lasers; or
determine a distance between the input detection apparatus and the reference plane based on the self-mixing interference signals generated by all the second lasers and a relative position between the at least two second lasers; and
wherein determination of the distance between the input detection apparatus and the reference plane comprises:
determining the distances between each of the laser emission spots of all the first lasers and each of the laser reflection spots of the reference plane based on the self-mixing interference signals generated by all the first lasers;
determining, based on the distances between the laser emission spots of all the first lasers and the laser reflection spots of the reference plane and the relative position information between the at least two first lasers, the included angle between the optical axis of the laser light emitted by the any first laser and the reference plane; and
determining the distance between the input detection apparatus and the reference plane based on a distance between a laser emission spot of any laser and the laser reflection spot of the reference plane and an included angle between an optical axis of laser light emitted by the any laser and the reference plane.

20. The input device according to claim 15, wherein the input detection apparatus further comprises a beam coupler corresponding to each laser, wherein:

each laser is coupled to the corresponding beam coupler, each beam coupler being configured to converge laser light emitted by the corresponding laser and then emit converged laser light and converge and feed back laser light obtained after being reflected by the reference plane to a resonant cavity of the laser corresponding to the beam coupler.

* * * * *